United States Patent
Gupta et al.

(10) Patent No.: US 11,900,921 B1
(45) Date of Patent: Feb. 13, 2024

(54) MULTI-DEVICE SPEECH PROCESSING

(71) Applicant: Amazon Technologies, Inc., Seattle, WA (US)

(72) Inventors: Rahul Gupta, Waltham, MA (US); Christophe Dupuy, Cambridge, MA (US); Jacob Ryan Stolee, Toronto (CA); Clement Chung, Toronto (CA)

(73) Assignee: Amazon Technologies, Inc., Seattle, WA (US)

( * ) Notice: Subject to any disclaimer, the term of this patent is extended or adjusted under 35 U.S.C. 154(b) by 189 days.

(21) Appl. No.: 17/080,189

(22) Filed: Oct. 26, 2020

(51) Int. Cl.
*G10L 15/22* (2006.01)
*G10L 15/16* (2006.01)

(52) U.S. Cl.
CPC ............. *G10L 15/16* (2013.01); *G10L 15/22* (2013.01)

(58) Field of Classification Search
CPC .......... G10L 15/18; G10L 15/22; G10L 15/30
See application file for complete search history.

(56) References Cited

U.S. PATENT DOCUMENTS

| | | | | |
|---|---|---|---|---|
| 6,408,272 B1* | 6/2002 | White | ............ | G10L 15/30 704/E15.047 |
| 6,487,534 B1* | 11/2002 | Thelen | ............ | G10L 15/26 704/E15.047 |
| 6,633,846 B1* | 10/2003 | Bennett | ............ | G06F 16/24522 704/E15.047 |
| 7,225,134 B2 | 5/2007 | Kamiya | | |
| 8,494,852 B2 | 7/2013 | LeBeau et al. | | |
| 9,454,957 B1 | 9/2016 | Mathias et al. | | |
| 9,940,927 B2 | 4/2018 | Georges et al. | | |
| 10,388,277 B1* | 8/2019 | Ghosh | ............ | G10L 15/1822 |
| 10,896,681 B2 | 1/2021 | Aleksic et al. | | |
| 11,721,347 B1 | 8/2023 | Pasko et al. | | |
| 2006/0190268 A1 | 8/2006 | Wang | | |
| 2008/0120094 A1 | 5/2008 | Mate et al. | | |
| 2012/0059658 A1 | 3/2012 | Sejnoha et al. | | |
| 2012/0215528 A1 | 8/2012 | Nagatomo | | |
| 2014/0136183 A1* | 5/2014 | Hebert | ............ | G06F 40/279 704/9 |
| 2015/0161522 A1* | 6/2015 | Saon | ............ | G06N 3/045 706/12 |
| 2015/0242386 A1 | 8/2015 | Moreno Mengibar et al. | | |

(Continued)

OTHER PUBLICATIONS

Shinde, Pramila P., and Seema Shah. "A review of machine learning and deep learning applications." 2018 Fourth international conference on computing communication control and automation (ICCUBEA). IEEE, 2018. (Year: 2018).*

*Primary Examiner* — Jialong He
(74) *Attorney, Agent, or Firm* — Pierce Atwood LLP

(57) ABSTRACT

Techniques for partially processing an input on a device and completing processing at a remote system are provided. The device may process an input using an on-device machine learning (ML) model, and determine to cease processing at an intermediary node of the (ML) model based on the output of the intermediary node. Based on the output of the intermediary node satisfying a condition, the device may use the output of the intermediary node to generate an output responsive to the input. Conversely, if the output of the intermediary node does not satisfy a condition, the device may send the output of the intermediary node to the remote system, so the remote system can use another machine learning model to complete processing with respect to the input.

20 Claims, 14 Drawing Sheets

(56) References Cited

U.S. PATENT DOCUMENTS

| | | | |
|---|---|---|---|
| 2017/0060848 A1* | 3/2017 | Liu | G06F 40/40 |
| 2019/0130904 A1* | 5/2019 | Homma | G10L 15/26 |
| 2020/0118554 A1* | 4/2020 | Chan | G06F 40/197 |

* cited by examiner

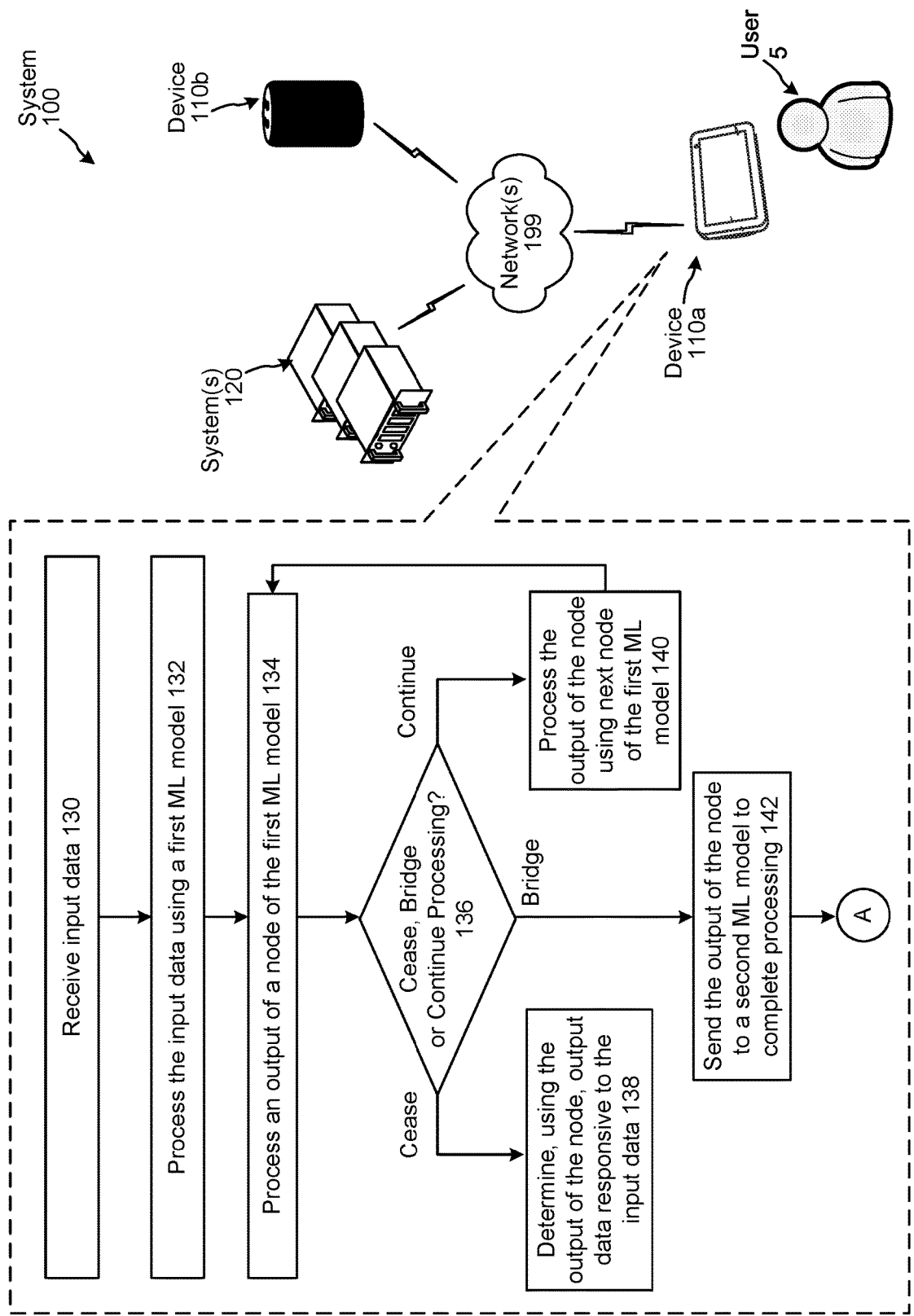

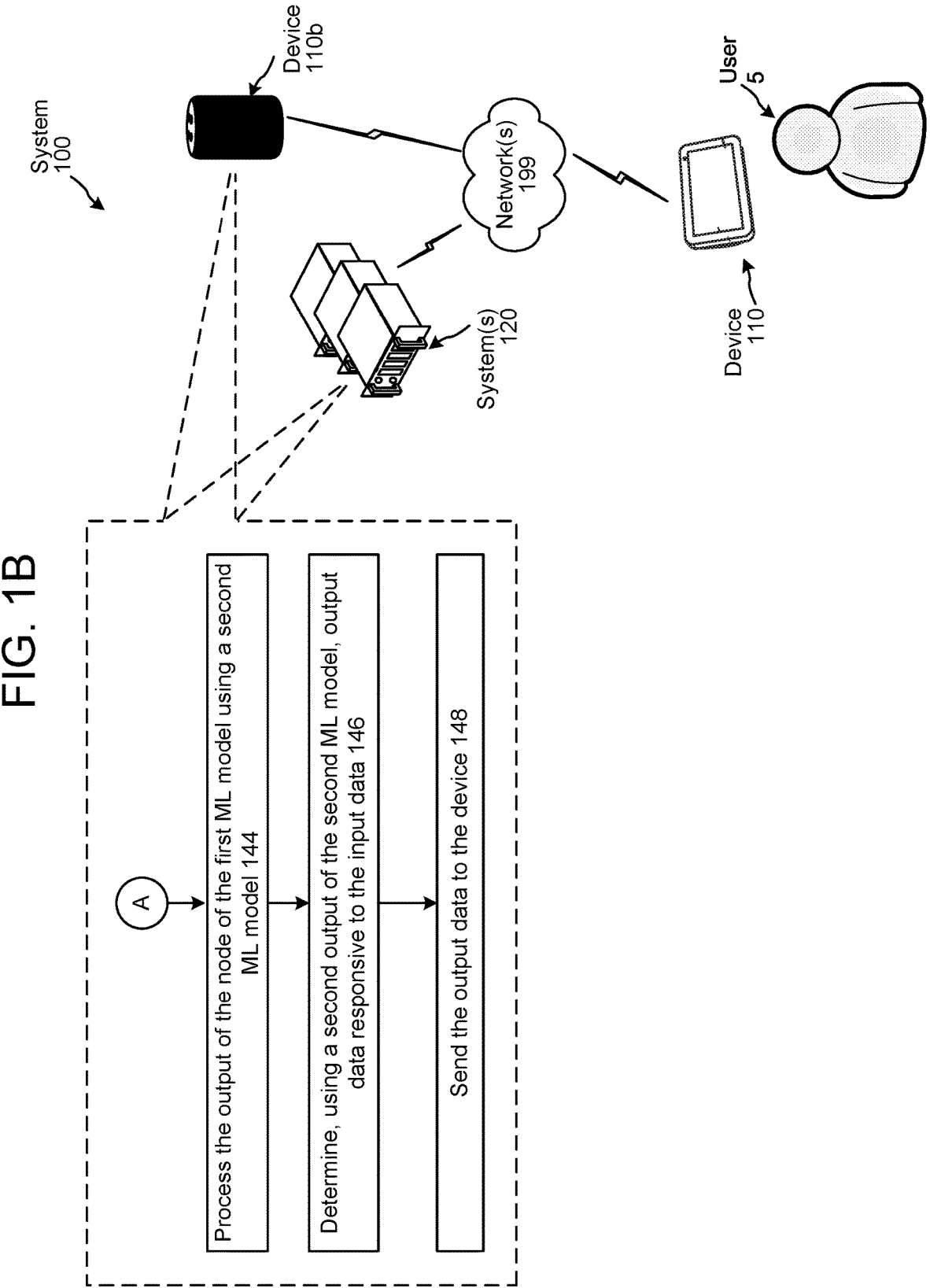

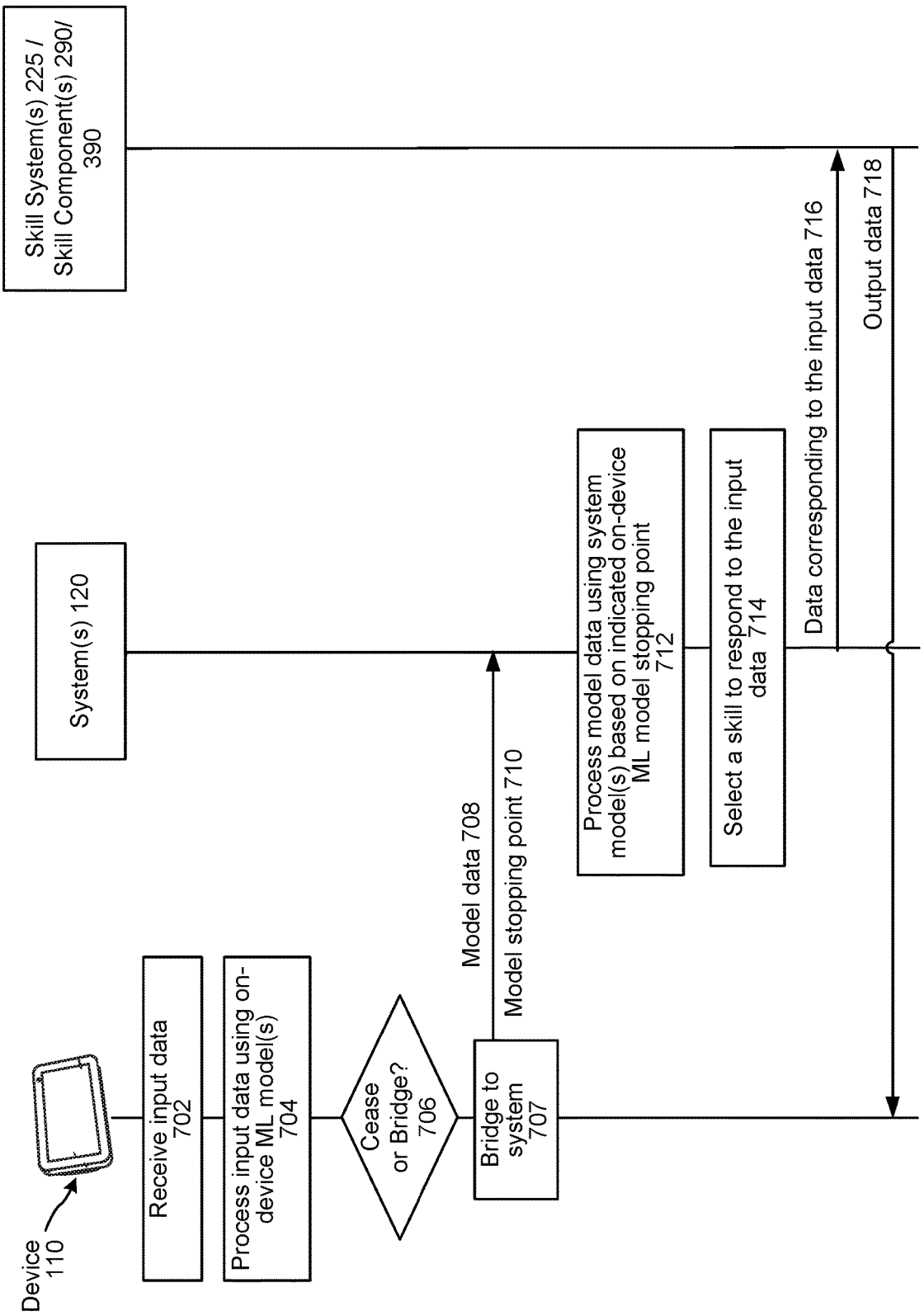

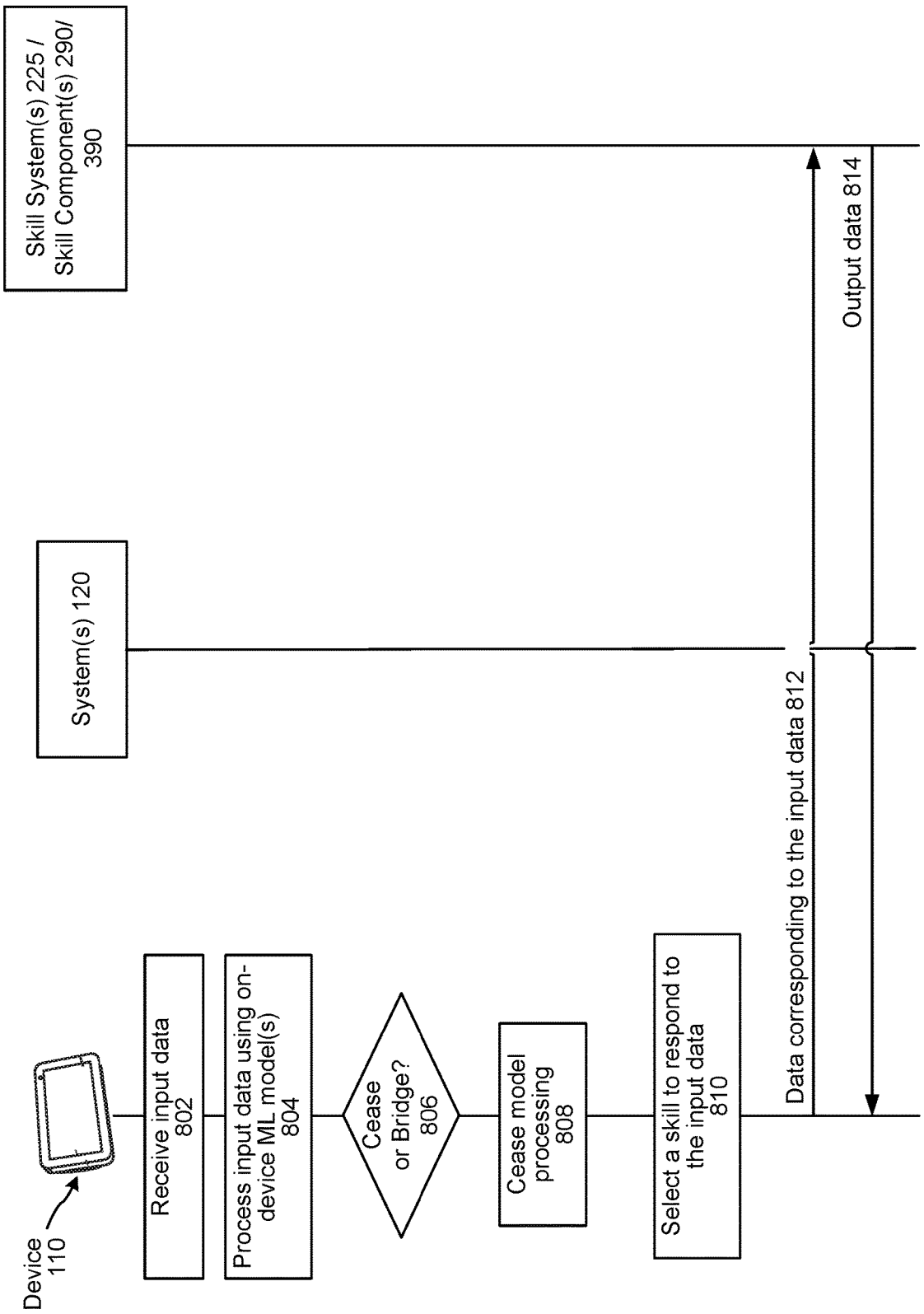

MULTI-DEVICE SPEECH PROCESSING

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A-1B are conceptual diagrams illustrating a system configured to perform processing partially on a device and partially by a system, according to embodiments of the present disclosure.

FIG. 7 is a signal flow diagram illustrating how input data may be processed by a device and a system, according to embodiments of the present disclosure.

FIG. 8 is a signal flow diagram illustrating how input data may be processed by a device and a system, according to embodiments of the present disclosure.

DETAILED DESCRIPTION

Figure 2:
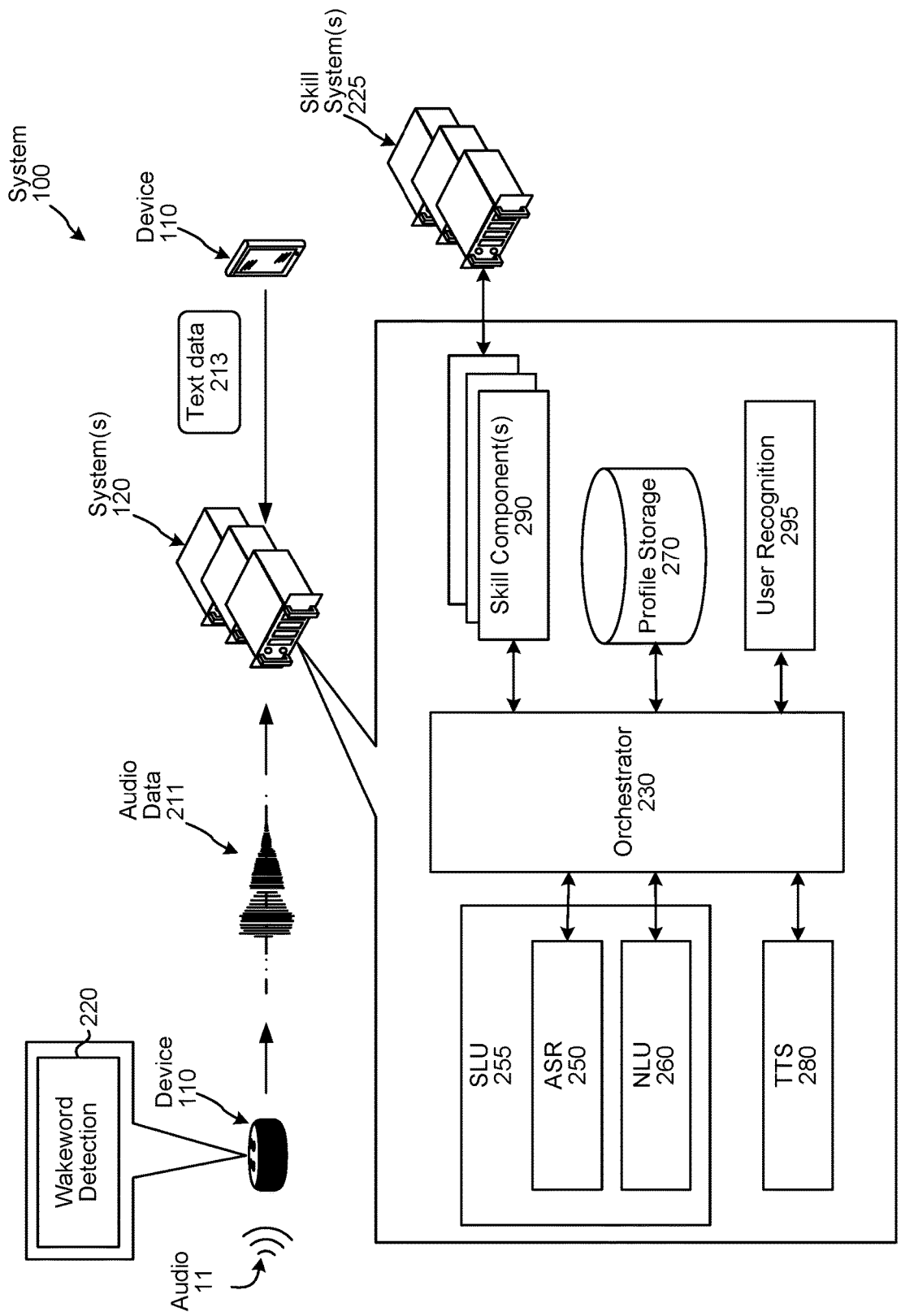
FIG. 2 is a conceptual diagram of components of a system, according to embodiments of the present disclosure.

Automatic speech recognition (ASR) is a field of computer science, artificial intelligence, and linguistics concerned with transforming audio data associated with speech into a token(s) or other textual representation of that speech. Natural language understanding (NLU) is a field of computer science, artificial intelligence, and linguistics concerned with enabling computers to derive meaning from natural language user inputs (such as spoken inputs). ASR and NLU are often used together as part of a spoken language understanding (SLU) processing component of a system. Text-to-speech (TTS) is a field of computer science, artificial intelligence, and linguistics concerned with transforming text and/or other data into audio data synthesized to resemble human speech.

Certain systems may be configured to perform actions responsive to user inputs. For example, for the user input of "Alexa, play music by <Artist>," a system may output music sung by the indicated artist. For further example, for the user input of "Alexa, turn on the lights," a system may turn on lights based on where the user is located. In another example, for the user input of "Alexa, find flights to Miami," a system may search, using another system, for flights from the user's location to Miami, and present the available flights to the user for selection.

In some cases, a system may be configured so that speech processing (i.e., ASR processing, and NLU processing, or SLU processing) of a user input is wholly performed by a device. In other cases, a system may be configured so that speech processing of a user input is wholly performed by a system separate and remote from the device (e.g., the cloud). In such cases, the device may receive a user input and send the user input to the system for speech processing.

The present disclosure relates to techniques for partial processing of a user input at a device and partial processing of the user input at a remote system, when appropriate. In particular, the present disclosure describes techniques for processing data using an on-device component, including a machine learning (ML) model(s), and determining to complete processing using a component at the remote system when the on-device component is not able to complete the processing. In some embodiments, the device is capable of making dynamic decisions regarding when to cease processing at the device and when to bridge to the remote system to complete processing. As used herein, "bridge processing" refers to when a device requests a remote system or another device to complete processing of data that the device may have (partially) processed already or may not have processed. The on-device component may include multiple egress points at different nodes of processing, where the device determines to cease processing or bridge processing. In some embodiments, the decision to cease processing or bridge processing may be based on the output of the corresponding node, the processing time spent by the device, the processing time that may still need to be spent by the device to complete processing, the computational resources of the device, the complexity of the user input, and/or other factors.

In some embodiments, the component on the remote system, including a ML model(s), may pick up processing of the user input where the device left off. When the device determines to bridge processing to the remote system, the device may send (to the remote system) data corresponding to the processing performed by the device thus far, and the remote system may initiate processing using that data. Data sent between the device and the remote system may be sent using privacy preserving techniques, such as encryption, addition of noise to the data, etc.

In some cases, the device of the present disclosure may determine to complete processing at the device, when possible, and may only request the remote system to complete processing of the user input when the device is not capable of doing so (with a certain level of confidence, for example).

The techniques of the present disclosure may provide an improved user experience and an improved system for processing user inputs. For example, the techniques described herein may improve preservation of privacy as only user inputs that the device is not capable of processing may be sent to the remote system for processing. Allowing a device to bridge processing per the techniques described herein also improves accuracy and decreases user-perceived latency with respect to processing of user inputs. Also, the need to compress a full ML model(s) to include on the device is minimized, as the device can bridge processing to the remote system when needed.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The systems, devices, components, and techniques can be implemented on a geographic basis to ensure compliance with laws in various jurisdictions and entities in which the components of the systems, devices, components, and/or user are located.

FIGS. 1A-1B illustrate a system 100 configured to perform processing using a device 110a, a device 110b and a system(s) 120. Although the figures and discussion of the present disclosure illustrate certain steps in a particular order, the steps described may be performed in a different order (as well as certain steps removed or added) without departing from the present disclosure. As shown in FIGS. 1A-1B, the system 100 may include the devices 110a, 110b (local to a user 5) and the system(s) 120 in communication across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

Referring to FIG. 1A, the device 110a receives (130) input data representing an input provided by the user 5 to the device 110a. In some cases, the input data may be audio data representing a spoken natural language input. In some cases, the input data may be text data representing a text-based natural language input. In other cases, the input data may be a sequence of images, captured by a camera of the device 110a, representing the user 5 performing a gesture, or facial expressions of the user 5. The input data may be motion sensor data captured by a motion sensor of the device 110a. The input data may represent an input received via a button on the device 110 or a touchscreen of the device 110a.

The device 110a processes (132) the input data using a first machine learning (ML) model. The first ML model may be considered an on-device ML model. The first ML model may be configured to process data of the same type as the input data, and generate a prediction corresponding to the input data. For example, in the case the input data is a spoken input, the first ML model may be configured to process audio data representing spoken inputs and perform SLU processing. In another example, in the case the input data is a natural language text input, the first ML model may be configured to process text data representing natural language inputs and perform NLU processing. In yet another example, in the case the input data is an image(s) representing facial expressions of the user 5, the first ML model may be configured to process image data and perform sentiment detection. In some cases, where the input data is audio data representing a spoken input or other data representing a natural language input, the first ML model may be configured to perform spoken language understanding (SLU) processing or natural language understanding (NLU) processing with respect to the input data. The first ML model may include multiple processing nodes that may be invoked in a sequential manner to process the input data. The first ML model may include at least an initial node, one or more intermediary nodes, and a final node. Each node of the first ML model may generate an output based on the processing performed by the node. The output may represent the features learned by the node.

The device 110a processes (134) an (first) output of a (first) node of the first ML model. The first node may be the initial node or an intermediary node of the first ML model. The first output may be the features determined by the first node during processing of the input data. The device 110a may process the first output using one or more processing blocks. The processing blocks may be a convolutional layer, a softmax layer, or other types of layers used in a deep learning model. By processing the first output using the processing blocks, the device 110a may derive a prediction from the first output and determine a confidence value corresponding to the prediction.

Based on processing the first output, the device 110a determines (136) whether to exit, bridge or continue processing at the first ML model. If processing of the first output indicates that the first ML model is confident in its prediction of the first node, then the device 110a ceases processing at the first ML model, and the device 110a determines (138), using the first output, output data responsive to the input data. The device 110a may determine a confidence value/score associated with the first output and/or derived from processing the first output, and if the confidence value/score meets a threshold confidence value/score then the device 110a may determine that the first ML model is confident in its prediction of the first node. In this scenario, the device 110a uses a prediction of an initial or intermediary node of the first ML model, rather than the prediction of the final node, to generate output data responsive to the input data. This may reduce latency in responding to the user 5.

If processing of the first output indicates that the first ML model is not confident in its prediction of the first node but that the first ML model is capable of generating a high confidence prediction (or the first ML model is confident at the first node that the next node is capable of generating a high confidence prediction), then the device 110 continues processing at the first ML model, and the device 110 processes (140) the first output using the next (second) node of the first ML model. The device 110a may determine a confidence value/score associated with the first output and/or derived from processing the first output, and if the confidence value/score does not meet a threshold confidence value/score then the device 110a may determine that the first ML model is not confident in its prediction of the first node.

In continuing processing at the first ML model, the device 110a may process an (second) output of the second node of the first ML model (per the step 134), and may determine, based on processing the second output of the second node, whether to cease, bridge or continue processing at the first ML model (per the step 136).

If the processing of the first output indicates that first ML model is not confident in the prediction of the first node and that further processing by the first ML model will not result in a high confidence prediction, then the device 110 bridges processing to the system(s) 120, and the device 110a sends (142) the first output to a second ML model to complete processing. The second ML model may be included at the system(s) 120 or the device 110b. Thus, in this scenario, the device 110a uses a prediction of an initial or intermediary node of the first ML model to determine that the first ML model will not generate an accurate prediction (a prediction with high confidence), and then requests the system(s) 120 or the device 110b to complete processing instead. This may improve accuracy in generating output data responsive to the input data. This may also reduce latency because the device 110a, in some cases, does not wait for the first ML model to complete processing to then determine that the first ML model prediction has low confidence, and then send the input data to the system(s) 120 or the device 110b to perform processing. The system(s) 120 and the device 110b picks up processing where the device 110a left off.

Referring to FIG. 1B, the system(s) 120 or the device 110b processes (144) the first output, of the node of the first ML model, using a second ML model. The second ML model may be configured to perform the same type of processing as the first ML model. For example, the first ML model and the second ML model may be configured to perform SLU processing. In another example, the first ML model and the second ML model may be configured to perform NLU processing. In yet another example, the first ML model and the second ML model may be configured to perform sentiment detection. Using the first output, the second ML model may pick up processing where the first ML model left off. Thus, the second ML model may not relearn/re-determine the features that the first ML model already learned/determined. The second ML model may complete processing with respect to the input data, and may generate a second output. The system(s) 120 or the device 110b determines (146), using the third output of the second ML model, output data responsive to the input data. The third output may be an output of a final node of the second ML model. In some embodiments, the third output may be an output of an initial node or intermediary node of the second ML model. After determining the output data, the system(s) 120 or the device 110b sends (148) the output data to the device 110a for output to the user 5.

In some embodiments, the device 110a may determine to continue processing at the decision block 136 based on a network signal quality or network connection quality between the device 110a and the system(s) 120 or the device 110b. For example, if the network connection quality is low/poor between the device 110a and the system(s) 120, then the device 110a may continue processing per the step 140. Thus, instead of risking the system(s) 120 not receiving the output of the node (as done in step 142), the device 110a may continue processing at the first ML model. Once the network connection improves, the device 110a may bridge processing to the system(s) 120. Similarly, the device 110a may determine to continue processing at the decision block 136 if the network connection quality is low/poor between the device 110a and the device 110b. In some embodiments, the device 110a may determine to continue processing at the decision block 136 based on the device 110b being presently engaged in performing other operations, such as processing a user input, received at the device 110b, from the user 5 or another user.

The system 100 may operate using various components as illustrated in FIG. 2. The various components may be located on a same or different physical devices. Communication between various components may occur directly or across a network(s) 199.

A microphone or array of microphones (of or otherwise associated with a device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may determine if the speech is directed at the device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 220 detects a wakeword, the device 110 may "wake" and begin transmitting audio data 211, representing the audio 11, to the system 120. The audio data 211 may include data corresponding to the detected wakeword, or the device 110 may remove the portion of the audio corresponding to the detected wakeword prior to sending the audio data 211 to the system 120.

The system 120 may include an orchestrator component 230 configured to, among other things, coordinate data transmissions between components of the system 120. The orchestrator component 230 may receive the audio data 211 from the device 110, and send the audio data 211 to an ASR component 250.

The ASR component 250 transcribes the audio data 211 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 211. Each ASR hypothesis may be associated with a score representing a confidence of ASR processing performed to determine the ASR hypothesis with which the score is associated.

The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211.

In at least some instances, instead of the device 110 receiving audio 11, the device 110 may receive a text-based (e.g., typed) natural language user input. The device 110 may determine text data 213 representing the typed natural language user input, and may send the text data 213 to the system 120, wherein the text data 213 is received by the orchestrator component 230.

The orchestrator component 230 may send the text data 213 or ASR output data output, depending on the type of natural language user input received, to a NLU component 260. The NLU component 260 processes the ASR output data or text data to determine one or more NLU hypotheses embodied in NLU output data. The NLU component 260 may perform intent classification (IC) processing on the ASR output data or text data to determine an intent of the natural language user input. An intent corresponds to an action to be performed that is responsive to the natural language user input. To perform IC processing, the NLU component 260 may communicate with a database of words linked to intents. For example, a music intent database may link words and phrases such as "quiet," "volume off," and "mute" to a <Mute> intent. The NLU component 260 identifies potential intents by comparing words and phrases in ASR output data or text data to the words and phrases in an intents database. In at least some embodiments, the NLU component 260 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 260 may also perform named entity recognition (NER) processing on the ASR output data or text data to determine one or more portions (which may be referred to as one or more slots) of the natural language user input that may be needed for post-NLU processing (e.g., processing performed by a skill). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the NLU component 260 may be linked to one or more grammar frameworks with "slots" to be filled. Each slot of a grammar framework corresponds to a portion of ASR output data or text data that the NLU component 260 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 260 may perform NER processing to identify words in ASR output data or text data as subject, object, verb, preposition, etc. based on grammar rules and/or models. Then, the NLU component 260 may perform IC processing that involves using the identified verb to identify an intent. Thereafter, the NLU component 260 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 260 may generate NLU output data including one or more NLU hypotheses, with each NLU hypothesis including the intent and slot(s) determined from IC processing and NER processing of the ASR output data or text data. In at least some embodiments, the NLU component 260 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 250 and the NLU component 260). In at least some embodiments, the system 120 may implement a spoken language understanding (SLU) component 255 configured to process audio data 211 to determine NLU output data.

The SLU component 255 may be equivalent to a combination of the ASR component 250 and the NLU component 260. Yet, the SLU component 255 may process audio data 211 and directly determine the NLU output data, without an intermediate step of generating ASR output data. As such, the SLU component 255 may take audio data 211 representing speech and attempt to make a semantic interpretation of the speech. That is, the SLU component 255 may determine a meaning associated with the speech and then implement that meaning. For example, the SLU component 255 may interpret audio data 211 representing speech from the user 5 in order to derive a desired action. The SLU component 255 may output a most likely NLU hypothesis, or multiple NLU hypotheses associated with respective confidence or other scores (such as probability scores, etc.).

The NLU component 260 (or the SLU component 255 depending on configuration of the system 120) may send the NLU output data to the orchestrator component 230. The orchestrator component 230 may send the top-scoring NLU hypothesis (in the NLU output data) to a skill associated with the NLU hypothesis.

The system 120 may include one or more skill components 290 and/or may communicate with one or more skill systems 225 via one or more skill components 290. As used herein, a "skill" may refer to a skill component 290, a skill system 225, or a combination of a skill component 290 and a skill system 225. A skill may be configured to execute with respect to NLU output data. For example, for an NLU hypothesis including a <GetWeather> intent, the system 120 (and more particularly the orchestrator component 230) may invoke a weather skill to determine and output weather information for a geographic location represented in a user profile or corresponding to a location of the device 110 that captured the corresponding natural language user input. For further example, for an NLU hypothesis including a <BookRide> intent, the system 120 (and more particularly the orchestrator component 230) may invoke a taxi skill to book a requested ride. In another example, for an NLU hypothesis including a <BuyPizza> intent, the system 120 (and more particularly the orchestrator component 230) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include a TTS component 280 that determine audio data (e.g., synthesized speech) from text data using one or more different methods. Text data input to the TTS component 280 may come from a skill, the orchestrator component 230, or another component of the system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to determine audio data including an artificial speech waveform. Parametric synthesis uses a computerized voice generator, sometimes called a vocoder.

The system 120 may include a user recognition component 295. The user recognition component 295 may recognize one or more users using various data. The user recognition component 295 may take as input the audio data 211. The user recognition component 295 may perform user recognition by comparing speech characteristics, in the audio data 211, to stored speech characteristics of users (e.g., stored speech characteristics associated with user profile identifiers associated with the device 110 that determined the audio data 211). The user recognition component 295 may additionally or alternatively perform user recognition by comparing biometric data (e.g., fingerprint data, iris data, retina data, etc.), received by the system 120 in correlation with a natural language user input, to stored biometric data of users (e.g., stored biometric data associated with user profile identifiers associated with the device 110 that determined the audio data 211 or otherwise captured a user input). The user recognition component 295 may additionally or alternatively perform user recognition by comparing image data (e.g., including a representation of at least a feature of a user), received by the system 120 in correlation with a natural language user input, with stored image data including representations of features of different users (e.g., stored image data associated with user profile identifiers associated with the device 110 that determined the audio data 211 or otherwise captured a user input). The user recognition component 295 may perform other or additional user recognition processes, including those known in the art. For a particular user input, the user recognition component 295 may perform processing with respect to stored data of users associated with the device 110 that captured the user input.

The user recognition component 295 determines whether a user input originated from a particular user. For example, the user recognition component 295 may determine a first value representing a likelihood that a user input originated from a first user, a second value representing a likelihood that user input originated from a second user, etc. The user recognition component 295 may also determine an overall confidence regarding the accuracy of user recognition processing.

The user recognition component 295 may output a single user profile identifier corresponding to the most likely user that originated the user input. Alternatively, the user recognition component 295 may output multiple user profile identifiers (e.g., in the form of an N-best list) with respective values representing likelihoods of respective users originating the user input. The output of the user recognition component 295 may be used to inform NLU processing, processing performed by a skill, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 270 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

Figure 3:
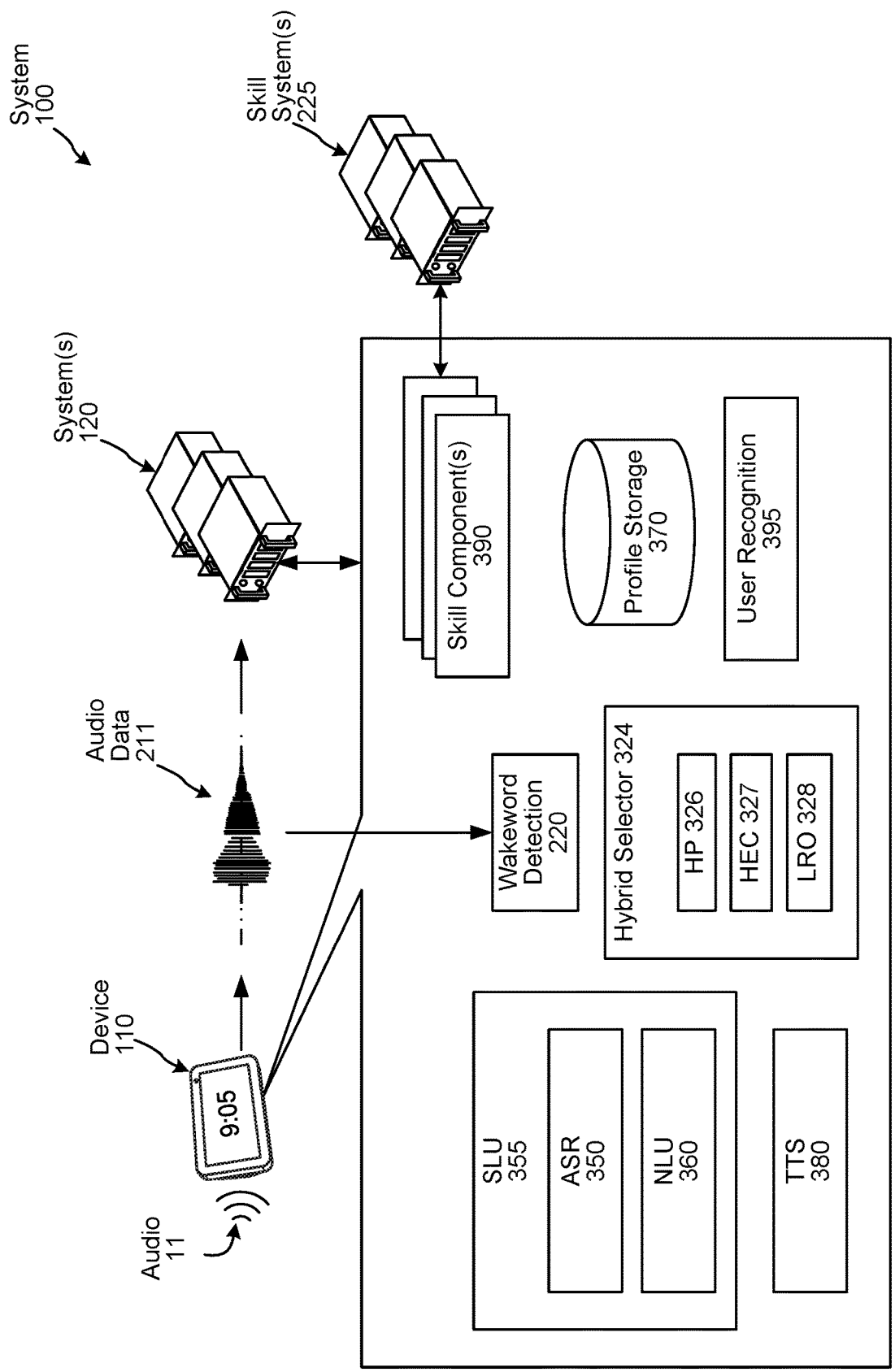
FIG. 3 is a conceptual diagram illustrating components that may be included in a device, according to embodiments of the present disclosure.

The foregoing describes illustrative components and processing of the system 120. In at least some embodiments, the device 110 may be configured to include some or all of the components, and perform some or all of the processing, of the system 120 described above. FIG. 3 illustrates such a configured device 110.

In at least some embodiments, the system 120 may receive the audio data 211 from the device 110, to recognize speech corresponding to a spoken input in the received audio data 211, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 380) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 2, the device 110 may include a wakeword detection component 220 configured to compare the audio data 211 to stored models used to detect a wakeword (e.g., "Alexa") that indicates to the device 110 that the audio data 211 is to be processed for determining NLU output data (e.g., slot data that corresponds to a named entity, label data, and/or intent data, etc.). In at least some embodiments, a hybrid selector 324, of the device 110, may send the audio data 211 to the wakeword detection component 220. If the wakeword detection component 220 detects a wakeword in the audio data 211, the wakeword detection component 220 may send an indication of such detection to the hybrid selector 324. In response to receiving the indication, the hybrid selector 324 may send the audio data 211 to the system 120 and/or the ASR component 350. The wakeword detection component 220 may also send an indication, to the hybrid selector 324, representing a wakeword was not detected. In response to receiving such an indication, the hybrid selector 324 may refrain from sending the audio data 211 to the system 120, and may prevent the ASR component 350 from further processing the audio data 211. In this situation, the audio data 211 can be discarded.

The device 110 may conduct its own speech processing using on-device language processing components, such as an SLU component 355 (an ASR component 350 and an NLU 360), similar to the manner discussed above with respect to the SLU component 255 (or ASR component 250 and the NLU component 260) of the system 120. The device 110 may also internally include, or otherwise have access to, other components such as one or more skill components 390 capable of executing commands based on NLU output data or other results determined by the device 110/system 120, a user recognition component 395 (configured to process in a similar manner to that discussed above with respect to the user recognition component 295 of the system 120), profile storage 370 (configured to store similar profile data to that discussed above with respect to the profile storage 270 of the system 120), or other components. In at least some embodiments, the profile storage 370 may only store profile data for a user or group of users specifically associated with the device 110. Similar to as described above with respect to FIG. 2, a skill component 390 may communicate with a skill system(s) 225.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 211 to pass to the system 120 while also receiving (e.g., intercepting) this audio data 211 and sending the audio data 211 to the HEC 327.

In at least some embodiments, the hybrid selector 324 may further include a local request orchestrator (LRO) 328 configured to notify the ASR component 350 about the availability of new audio data 211 that represents user speech, and to otherwise initiate the operations of on-device language processing when new audio data 211 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 211 is received, the HP 326 may allow the audio data 211 to pass through to the system 120 and the HP 326 may also input the audio data 211 to the on-device ASR component 350 by routing the audio data 211 through the HEC 327 of the hybrid selector 324, whereby the LRO 328 notifies the ASR component 350 of the audio data 211. At this point, the hybrid selector 324 may wait for response data from either or both of the system 120 or the on-device language processing components. However, the disclosure is not limited thereto, and in some examples the hybrid selector 324 may send the audio data 211 only to the on-device ASR component 350 without departing from the disclosure. For example, the device 110 may process the audio data 211 on-device without sending the audio data 211 to the system 120.

The on-device ASR component 350 is configured to receive the audio data 211 from the hybrid selector 324, and to recognize speech in the audio data 211, and the on-device NLU component 360 is configured to determine a user intent from the recognized speech, and to determine how to act on the user intent by generating NLU output data which may include directive data (e.g., instructing a component to perform an action). Such NLU output data may take a form similar to that as determined by the NLU component 260 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

An NLU hypothesis (output by the NLU component 360) may be selected as usable to respond to a natural language user input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 211 to the system 120, and the response data from the system 120 may include the unique identifier to identify which natural language user input the response data corresponds.

In at least some embodiments, the device 110 may include, or be configured to use, one or more skill components 390 that may work similarly to the skill component(s) 290 implemented by the system 120. The skill component(s) 390 may correspond to one or more domains that are used in order to determine how to act on a spoken input in a particular way, such as by outputting a directive that corresponds to the determined intent, and which can be processed to implement the desired operation. The skill component(s) 390 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 225. For example, a skill system 225 may be located in a remote environment (e.g., separate location) such that the device 110 may only communicate with the skill system 225 via the network(s) 199. However, the disclosure is not limited thereto. For example, in at least some embodiments, a skill system 225 may be configured in a local environment (e.g., home server and/or the like) such that the device 110 may communicate with the skill system 225 via a private network, such as a local area network (LAN).

As used herein, a "skill" may refer to a skill component 390, a skill system 225, or a combination of a skill component 390 and a skill system 225.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more.

Trained models come in a variety of forms including trained classifiers, Support Vector Machines (SVMs), neural networks (such as deep neural networks (DNNs), recurrent neural networks (RNNs), or convolutional neural networks (CNNs)), random forests, isolation forests, and others. As an example, a neural network typically includes an input layer, an output layer and one or more intermediate hidden layers where the input layer is configured to take in a certain kind of data and the output layer is configured to output the desired kind of data resulting from the network and the hidden layer(s) perform a variety of functions to generate output data from the input data.

Various techniques may be used to train ML models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

One or more of the components described in relation to FIGS. 2 and 3 may employ one or more ML models to perform the described functionalities. For example, the SLU component 255/355 may employ one or more deep neural networks (DNNs) or other type of deep ML models to process audio data 211 (representing speech from the user 5) and determine NLU output data, representing an intent and one or more entities indicated in the audio data 211. Described below are techniques for processing input data (such as the audio data 211) using an on-device ML model (for example, included in the SLU component 355), and sending feature data to the system(s) 120, when needed/appropriate, to enable the system(s) 120 (for example, using a ML model included in the SLU component 255) to complete processing with respect to the input data.

The improved performance of additional layers in a DNN may come at the cost of added latency and energy usage. As networks continue to get deeper and larger, these costs become more prohibitive for real-time and energy-sensitive applications. To address this issue, the ML model(s) on the device may be augmented with additional side branch classifiers. The architecture shown in FIG. 4 may allow the device to cease processing by the ML model(s) early when the prediction for the input data can already be inferred with high confidence. The architecture may also allow the device to bridge processing to the system 120 when the prediction for the input data cannot be inferred with high confidence. In some cases, features determined at an early node/layer of a ML model may be sufficient to make a prediction with respect to certain input data, in which case, the device may determine to cease processing. In some cases, based on the features learned at an early node/layer of the ML model, the device may be able to determine that the network is not capable of making a prediction with high confidence, in which case the device may determine to bridge processing. In other cases, the device may determine to continue processing using the remaining nodes/layers of the on-device ML model. Using such techniques can improve accuracy and reduce the time it takes to process input data.

Figure 4:
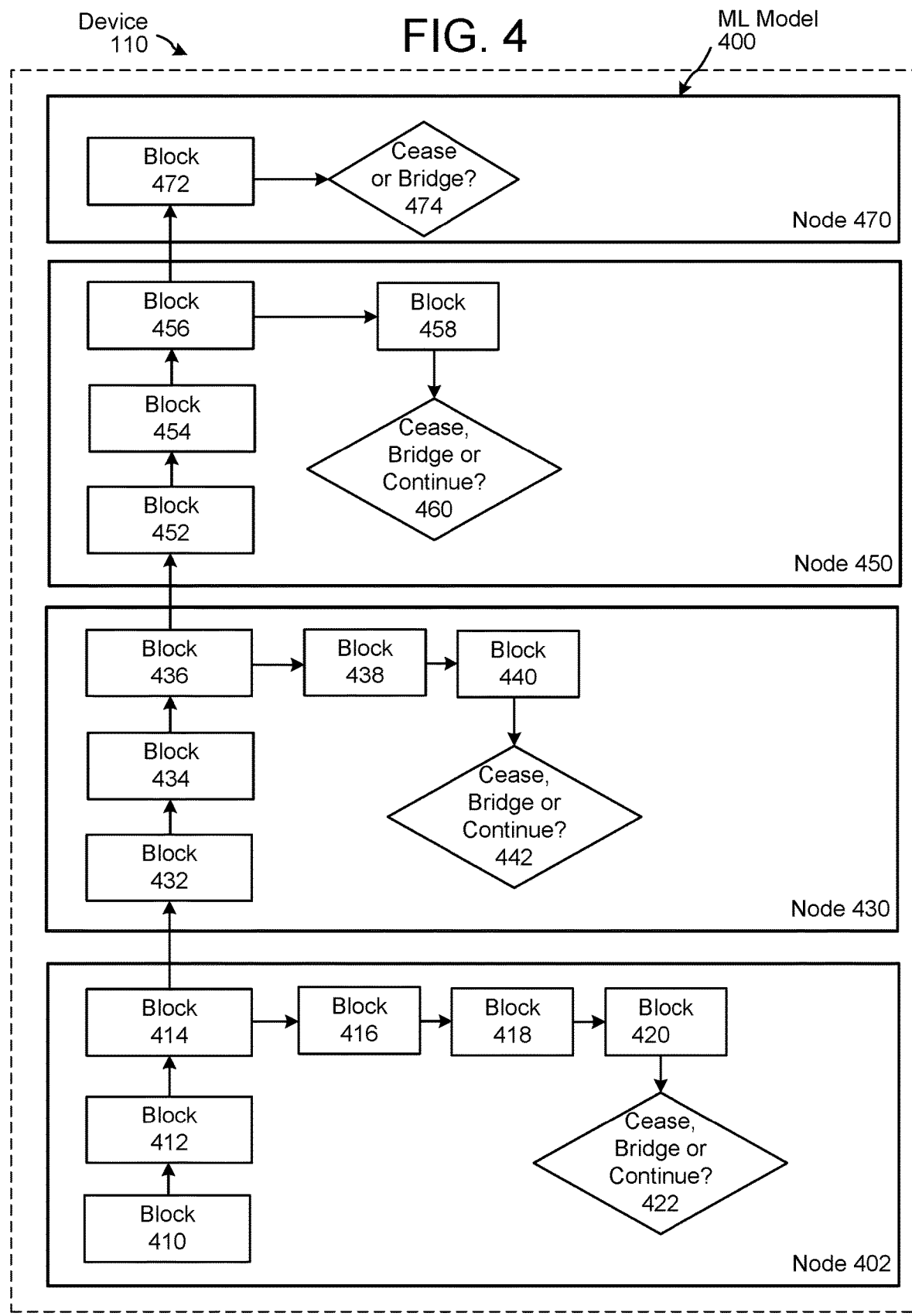
FIG. 4 is a conceptual diagram of a machine learning model, implemented by a device, with branches to determine further processing strategy, according to embodiments of the present disclosure.

In some embodiments, an existing ML model (e.g., a DNN) may be modified to include branches at various egress points, as shown in FIG. 4. For example, the existing ML model may include blocks 410, 412, 414, 432, 434, 436, 452, 454, 456, and 472. The blocks 414, 436, 456 and 472 may be considered egress points, and the blocks 416, 418, 420, 422, 438, 440, 442, 458, 460 and 474 may be considered branches. In some embodiments, after each node the ML model 400 makes a prediction and decides whether to go to the next node or to stop and return the prediction. During training a loss is computed at each egress point (after each node) and the training objective is to optimize a weighted sum of the losses. An ML model, including the processing nodes and processing blocks, may be stored as software in a memory of a device or computing system.

A ML model with branches as described herein, may consist of one entry point (at the first node of the ML model that receives input data) and multiple egress points. A branch may be a subset of the network containing contiguous layers, which do not overlap other branches, followed by an egress point. The main branch may be considered as the existing ML model (the original network) before the side branches are added.

The modified ML model architecture may promote faster inference via early egress points from branches. Through the branching structures and egress point criteria as well as joint optimization of loss functions for all egress points, the ML model may be able to leverage the insight that many data points can be correctly classified early and therefore do not need the later model layers/nodes.

FIG. 4 is a conceptual diagram of a ML model 400, included at the device 110, with branches to determine a strategy with respect to further processing the input data. In some embodiments, the ML model 400 may be a deep learning model, such as a DNN. The ML model 400 may include one or more processing nodes, such as, node 402, node 430, node 450 and node 470 (which may also be referred to as layers of a ML model). Each of the nodes 402, 430, 450 and 470 may include one or more processing blocks. In some embodiments, the processing blocks may be configured to perform convolutions. Each of the nodes 402, 430, 450 and 470 may also include a processing strategy decision block configured to determine whether the device 110 should cease processing, bridge processing to the system(s) 120 or continue processing at the device 110. Each processing node/layer may be a collection of processing blocks operating together at a specific depth within a neural network type ML model 400.

The first node, for example node 402, may be an input node/layer that processes raw input data. The intermediary nodes, for example nodes 430 and 450, may be hidden nodes/layers of a neural network type ML model 400, where each node is attempting to learn different aspects/features about the input data by minimizing an error/cost function. In the example embodiment where the ML model 400 is configured for facial recognition in images, the intermediary node 430 may perform edge detection in the image data, the intermediary node 450 may detect eyes, the next intermediary node (not shown) may detect a nose, etc. The final node/layer, for example node 470, may be an output node/layer that may consist of a single output for classification problems.

In some embodiments, the node 402 may be the first node of the ML model 400 on the device 110, and may receive the input data (such as, audio data 211) for processing. The node 402 may include a (first) block 410 configured to process the input data and provide output data to a (second) block 412, where the output data from the block 410 may be features learned from processing the input data. The block 412 may process the output data from the block 410 and provide output data to a (third) block 414, where the output data from the block 412 may be features learned from processing the output data from the block 410. The blocks 410, 412 and 414 may perform convolutional operations of a DNN.

In an example embodiment, the device 110, using the decision block 422, may determine to cease processing (cease processing) at the node 402 with respect to the input data, bridge processing at the node 402 to the system(s) 120 with respect to the input data, or continue processing the input data using the ML model 400. The data evaluated by the decision block 422 may be features or model output data determined by the block 414. The features or model output data determined by the block 414 may be further processed using one or more processing blocks, such as blocks 416, 418 and 420. Each of the blocks 416, 418 and 420 may perform convolution operations on the output of the block 414, thus, rendering the output of the block 414 into a form that may be evaluated by the decision block 422.

In some embodiments, the device 110 may cease processing at a particular node of the ML model 400 if the device 110 determines that the ML model 400 is capable of outputting a prediction with respect to the input data based on the processing performed at the node, and that processing by the remaining nodes of the ML model 400 will not result in a different prediction. The decision to cease processing by the device 110 may be based on a confidence score(s) derived from the output of the last processing block of the node. For example, in the node 402 the decision to cease processing may be based on the confidence score(s) derived from the output of the block 414 and determined by the blocks 416, 418 and 420. If the confidence score(s) satisfies a threshold confidence score/level, then the device 110 may determine to cease processing.

In some embodiments, the device 110 may bridge processing at a particular node of the ML model 400 if the device 110 determines that the ML model 400 on the device 110 is not capable of outputting a prediction with respect to the input data based on the processing performed at the node, and that processing by the remaining nodes of the ML model 400 will not result in a prediction either. In this case, the device 110 may bridge processing to a ML model 400 included in the system(s) 120, such that, processing with respect to the input data is completed by the system(s) 120. Further details on how bridge processing is performed are described with respect to FIG. 5. The decision to bridge processing by the device 110 may be based on a confidence score(s) derived from the output of the last processing block of the node. For example, in the node 402 the decision to bridge processing may be based on the confidence score(s) derived from the output of the block 414 and determined by the blocks 416, 418 and 420. If the confidence score(s) fails to satisfy a threshold confidence score/level, then the device 110 may determine to bridge processing.

In some embodiments, the device 110 may continue processing at the ML model 400 if the device 110 determines that the ML model 400 on the device 110 is capable of outputting a prediction with respect to the input data if processing is continued. In some embodiments, the device 110 may continue processing at the ML model 400 if the device 110 determines to not cease processing and determines to not bridge processing to the system(s) 120. The decision to continue processing by the device 110 may be based on a confidence score(s) derived from the output of the last processing block of the node. For example, in the node 402 the decision to continue processing may be based on the confidence score(s) derived from the output of the block 414 and determined by the blocks 416, 418 and 420. If the confidence score(s) satisfy a first threshold confidence score/value and fails to satisfy a second threshold confidence score/value, then the device 110 may determine to continue processing.

In some embodiments, the decision block 422 may evaluate binned representations of the confidence score(s) to determine whether to cease processing, bridge processing or continue processing. For example, the decision block 422 may determine to cease processing if the confidence score(s) is a high score, may determine to bridge processing if the confidence score(s) is a low score, and may determine to continue processing if the confidence score(s) is a medium score.

If the device 110 determines to continue processing at decision block 422, then the output of the block 414 may be provided to a block 432 (the first block) of the next node 430 of the ML model 400, so that the ML model 400 may continue processing with respect to the input data. The node 430 may include a (first) block 432 configured to process the output data from the block 414 and provide output data to a (second) block 434, where the output data from the block 432 may be features learned from processing the output data from the block 414. The block 434 may process the output data from the block 432 and provide output data to a (third) block 436, where the output data from the block 434 may be features learned from processing the output data from the block 432. The blocks 432, 434 and 436 may perform convolutional operations of the DNN.

In an example embodiment, the device 110, using the decision block 442, may determine to cease processing (cease processing) at the node 430 with respect to the input data, bridge processing at the node 430 to the system(s) 120 with respect to the input data, or continue processing the input data using the ML model 400. The data evaluated by the decision block 442 may be features or model output data determined by the block 436. The features or model output data determined by the block 436 may be further processed using one or more processing blocks, such as blocks 438 and 440. Each of the blocks 438 and 440 may perform convolution operations on the output of the block 436, thus, rendering the output of the block 436 into a form that may be evaluated by the decision block 442.

In the node 430 the decision to cease processing, bridge processing, or continue processing may be based on the confidence score(s) derived from the output of the block 436 and determined by the blocks 438 and 440. If the confidence score(s) satisfies a first threshold confidence score/level, then the device 110 may determine to cease processing at the node 430. If the confidence score(s) fails to satisfy a second (lower) threshold confidence score/level, then the device 110 may determine to bridge processing at the node 430. If the confidence score(s) satisfies the second (lower) threshold confidence score/level and fails to satisfy the first (higher) threshold confidence score/level, then the device 110 may determine to continue processing at the ML model 400.

In some embodiments, the decision block 442 may evaluate binned representations of the confidence score(s) to determine whether to cease processing, bridge processing or continue processing. For example, the decision block 442 may determine to cease processing at the node 430 if the confidence score(s) is a high score, may determine to bridge processing at the node 430 if the confidence score(s) is a low score, and may determine to continue processing if the confidence score(s) is a medium score.

If the device 110 determines to continue processing at decision block 442, then the output of the block 436 may be provided to a block 452 (the first block) of the next node 450 of the ML model 400, so that the ML model 400 may continue processing with respect to the input data. The node 450 may include a (first) block 452 configured to process the output data from the block 436 and provide output data to a (second) block 454, where the output data from the block 452 may be features learned from processing the output data from the block 436. The block 454 may process the output data from the block 452 and provide output data to a (third) block 456, where the output data from the block 454 may be features learned from processing the output data from the block 452. The blocks 452, 454 and 456 may perform convolutional operations of the DNN. In some embodiments, the block 456 may be perform pooling operations of the DNN.

In an example embodiment, the device 110, using the decision block 460, may determine to cease processing (exit processing) at the node 450 with respect to the input data, bridge processing at the node 450 to the system(s) 120 with respect to the input data, or continue processing the input data using the ML model 400. The data evaluated by the decision block 460 may be features or model output data determined by the block 456. The features or model output data determined by the block 456 may be further processed using one or more processing blocks, such as block 458. The block 458 may perform convolution operations on the output of the block 456, thus, rendering the output of the block 456 into a form that may be evaluated by the decision block 460.

In the node 450 the decision to cease processing, bridge processing, or continue processing may be based on the confidence score(s) derived from the output of the block 456 and determined by the block 458. If the confidence score(s) satisfies a first threshold confidence score/level, then the device 110 may determine to cease processing at the node 450. If the confidence score(s) fails to satisfy a second (lower) threshold confidence score/level, then the device 110 may determine to bridge processing at the node 450. If the confidence score(s) satisfies the second (lower) threshold confidence score/level and fails to satisfy the first (higher) threshold confidence score/level, then the device 110 may determine to continue processing at the ML model 400.

In some embodiments, the decision block 460 may evaluate binned representations of the confidence score(s) to determine whether to cease processing, bridge processing or continue processing. For example, the decision block 460 may determine to cease processing at the node 450 if the confidence score(s) is a high score, may determine to bridge processing at the node 450 if the confidence score(s) is a low score, and may determine to continue processing if the confidence score(s) is a medium score.

If the device 110 determines to continue processing at decision block 460, then the output of the block 456 may be provided to a block 472 of the next node 470 of the ML model 400, so that the ML model 400 may continue processing with respect to the input data. The block 472 may be the last processing block of the ML model 400. In some embodiments, the block 472 may be an activation layer, and may employ a rectified linear activation function (ReLu). In some embodiments, the block 472 may be a pooling layer. In some embodiments, the block 472 may be a softmax layer. In some cases, with the block 472 being the last processing block of the ML model 400, the output of the block 472 may be the prediction of the ML model 400 with respect to the input data.

In some embodiments, the device 110 may determine, at decision block 474, to cease processing or bridge processing at the node 470. The decision block 474 may evaluate the output of the block 472, which may be a confidence score(s) corresponding to the processing performed by the entire ML model 400. In this case, since the node 470 is the final processing node of the ML model 400, when the device 110 determines to cease processing, the device 110 is determining to use the prediction of the on-device ML model 400. In other words, the device 110 may determine that the prediction/output of the on-device ML model 400 with respect to the input data satisfies a threshold confidence score/level, and may be used by downstream components (as described with respect to FIGS. 2 and 3) to perform further processing of the input data. At decision block 474, if the device 110 determines to bridge processing to the system(s) 120, since the node 470 is the final processing node of the ML model 400, the device 110 is determining that the prediction/output of the on-device ML model 400 with respect to the input data does not satisfy a threshold confidence score/level, and may not be used by downstream components to perform further processing of the input data.

In some embodiments, the device 110 may consider other factors/data at the decision blocks 422, 442, 460 and 474 in determining whether to cease processing, bridge processing or continue processing. The factors may relate to and affect the latency in processing the input data and providing a responsive output to the user. The data may include time spent by the ML model 400 in processing the input data till the egress point, estimated time that the ML model 400 will spend if processing continues, the number of nodes and/or blocks of the ML model 400 that have processed the input data, the number of nodes and/or blocks remaining in the ML model 400 that can process the input data, the time elapsed since the device 110 received the input data, etc. The decision blocks 422, 442, 460 and 474 may also consider the number of iterations/computations/operations already performed by the ML model 400 in processing the input data till the egress point, and the number of iterations/computations/operations that may have to be performed if processing continues at ML model 400. The decision blocks 422, 442, 460, and 474 may also consider a divergence in the features determined by the respective node. In some embodiments, the decision blocks 422, 442, 460 and 474 may also consider the complexity of the input data in terms of the amount of data received, the quality of data received, etc. For example, if the input data is audio data 211, the length of the audio data 211 may be considered, the noise to signal ratio may be considered; if the input data is a natural language input, then the number of words in the input data may be considered. In some embodiments, the decision blocks 422, 442, 460 and 474 may consider the quality of the network connection between the device 110 and the system(s) 120. If the network connection is low/poor, then the system(s) 120 may not receive data sent by the device 110 or may be delayed in receiving the data sent by the device 110. In this case, the device 110 may determine to continue processing at the device 110 using the ML model 400, and reduce latency in processing the input data.

It should be understood that the ML model 400 may include fewer or more processing nodes than shown in FIG. 4. Each of the nodes may include fewer or more processing blocks than shown in FIG. 4. The architecture of the ML model 400 may vary from what is illustrated based on system configurations and ML model configurations.

The ML model 400, in some embodiments, may be trained by solving a joint optimization problem on the weighted sum of the loss functions associated with the egress points. The blocks 414, 436, 456 and 472, for example, may be considered as egress points. Once the ML model 400 is trained, the device 110 utilizes the egress points to determine whether to cease processing, bridge processing or continue processing, as described above, thus reducing the cost (time and resources-wise) of processing input data.

At each egress point, the device 110 may use the entropy of a classification result (e.g., output of a softmax layer at blocks 420, 440, 458 and 472) as a measure of confidence in the prediction. If the entropy is below a threshold value, meaning that the ML model 400 is confident in the prediction, the device 110 may cease processing, and the remaining nodes of the ML model 400 do not process the input data. If the entropy value is above a threshold value, then the ML model 400 is deemed not confident, and the device 110 may continue to the next nodes in the ML model 400. In some embodiments, if the entropy is below another threshold value, meaning that the ML model 400 is not capable of making a prediction with a high confidence, even if processing continues, then the device 110 may determine to bridge processing to the system(s) 120.

In some embodiments, if the entropy is below the threshold value and certain other conditions exist, then the device 110 may determine to bridge processing to the system(s) 120, to reduce latency in processing the input data and to increase accuracy in processing the input data. These other conditions may include, but are not limited to, the processing time already spent by the ML model 400 in processing the input data when the ML model 400 reached the egress point, the time since the input data was received by the device 110, the number of nodes remaining in the ML model 400 to process the input data, the number of nodes in the ML model 400 that already processed the input data, and others. In some embodiments, the device 110 may also compare a previous entropy (or previous confidence score) of the prediction at a previous egress point (e.g., the block 420) with the instant entropy (or instant confidence score) of the prediction at an instant egress point (e.g., the block 440) to determine whether there is positive or negative change in the entropy (or confidence score). If there is an increase in the instant entropy from the previous entropy (or a decrease in the instant confidence score from the previous confidence score) then the likelihood of the ML model 400 generating an accurate prediction may be low. That is, continued processing by the ML model 400 is not likely to result in an accurate prediction. In this case, the device 110 may determine to bridge processing to the system(s) 120 to complete processing. In this manner, the device 110 may not waste time by continuing to process at the device 110 when the ML model 400 is not going to be able to make a high confidence prediction.

In training the blocks in the branches, network regularization and mitigation of vanishing gradients in backprogation may also be considered. For the former, the branches may provide regularization on the existing ML model. For the latter, a relatively shallower branch (with fewer blocks) at a lower layer may provide more immediate gradient signal in backpropagation, resulting in discriminative features in lower nodes of the ML model 400, thus improving its accuracy.

In some embodiments, there may be fewer egress points than illustrated in FIG. 4. Each node of the ML model 400 may not have an egress point. For example, the first node 402 may not have an egress point because it may not be beneficial (time-wise and resource-wise) to evaluate the prediction made by the first node of the ML model 400, as the features learned at the first node may not be valuable for making a prediction. In other embodiments, there may be more than one egress point in a node of the ML model 400. In some embodiments, there may be fewer blocks in a branch for an egress point. For example, at node 402, there may only be block 416 (and no blocks 418 and 420).

In some embodiments, a node of the ML model 400 may include a combination of convolutional layers and fully-connected layers after the convolutional layers, enabling both local and global features to be combined at a node level, which may be used to make a decision at the egress point. The number of blocks in a first egress point branch may be less than the number of blocks in a second/next egress point branch, thus, lessening the amount of computation needed at a later egress point. Earlier egress points may include more processing blocks than later egress points. The blocks in the egress point branches may include a combination of convolutional layers and fully-connected layers.

The device 110 may base its decision at the egress points on the observation that lower and intermediate nodes of the ML model 400 may suffice to classify certain input data or determine that the ML model 400 is not going to be able to classify the input data.

Each of the processing blocks 410, 412, 414, 416, 418, 420, 432, 434, 436, 438, 440, 452, 454, 456, 458, and 472 may be configured to perform one or more operations of a ML model, for example, including but not limited to, a convolutional layer, a recurrent layer, a LSTM layer, a pooling layer, an averaging layer, a rectified linear activation function, a softmax layer, or other operations/layers of a ML model.

As the input data is processed by the nodes of ML model, the dimensions of the features determined by a node decreases, based on which later occurring egress branches may have fewer processing blocks. For example, the egress branch for node 450 may have one processing block 458 in the egress branch because the dimension of the feature vector outputted at block 456 may be smaller than dimension of the feature vector outputted by the block 414, where the egress branch has three blocks, 416, 418 and 420, for the node 402.

Figure 5:
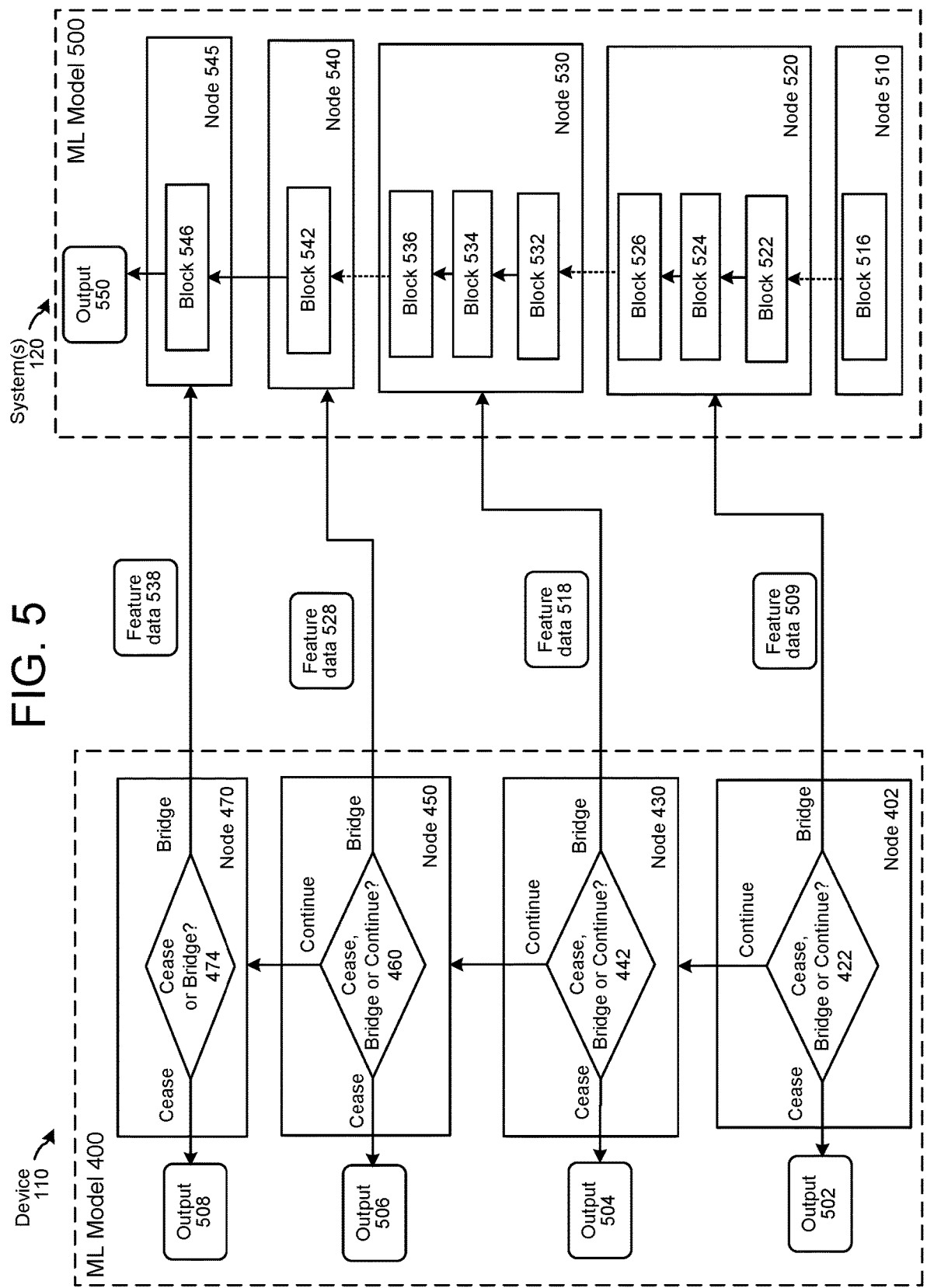
FIG. 5 is a conceptual diagram illustrating how an on-device machine learning model can bridge to a machine learning model, on a system, to perform further processing, according to embodiments of the present disclosure.

The system(s) 120 (or another device 110) may include one or more ML models (e.g., ML model 500 of FIG. 5) to perform the same type of processing performed by the ML model 400. The ML model 500 may include, in some embodiments, the same number of processing nodes as the on-device ML model 400. In some embodiments, the sequential nodes of the ML model 500 may correspond to the sequential nodes of the ML model 400. For example, the node 402 may be an initial/first node of the ML model 400, while node 510 may be an initial/first node of the ML model 500. FIG. 5 is a conceptual diagram illustrating how the on-device ML model 400 can bridge to a ML model 500 on the system(s) 120 to perform processing with respect to input data. As described in relation to FIG. 4, the device 110 may determine, at each processing node, whether to bridge processing to the system(s) 120.

At the decision block 422, the device 110 may determine to cease processing at the node 402, in response to which, the node 402 may provide output data 502 (e.g., the output of the block 414). The device 110 may use the output data 502 as the prediction of the ML model 400, and may provide the output data 502 to downstream components to perform further processing of the input data.

At decision block 422, the device 110 may determine to bridge processing at the node 402, in response to which, the device 110 may send feature data 509 to the system(s) 120. The feature data 509 may be the output of the block 414. In some embodiments, the feature data 509 may be embeddings determined based on processing by the block 414. In some embodiments, the feature data 509 may be token data determined based on processing by the block 414. In some embodiments, the device 110 may also provide data, to the system(s) 120, indicating where within the ML model 400 the device 110 decided to bridge processing. Such data may indicate a processing node and a processing block within the processing node, using a node identifier and a block identifier. The ML model 500 may pick up processing where the ML model 400 left off. The ML model 500 may do so using the node and block indicated by the device 110. As such, the system(s) 120 may not re-perform processing that the device 110 has already performed, thus, reducing latency.

At decision block 422, the device 110 may determine to continue processing at the ML model 400, in response to which, the output of the node 402 may be provided to the next node 430 of the ML model 400.

As shown in FIG. 5, at the nodes 430 and 450, the device 110, similarly to the decision block 422, may determine to cease processing, bridge processing or continue processing, via the decision blocks 442 and 460. Output data 504 may be provided by the node 430 if the device 110 determines to cease processing at the node 430. Feature data 518 may be provided to the system(s) 120 if the device 110 determines to bridge processing at the node 430. Output data 506 may be provided by the node 450 if the device 110 determines to cease processing at the node 450. Feature data 528 may be provided to the system(s) 120 if the device 110 determines to bridge processing at the node 450.

At the node 470, which may be the final processing node of the ML model 400, the device 110 may determine to cease processing and may send output data 508 generated by the node 470 to downstream components to perform further processing of the input data. In this case, the device 110 may determine to use the prediction of the on-device ML model 400. The device 110, at node 470, may determine to bridge processing to the system(s) 120, and may send feature data 538 to the system(s) 120. In this case, the device 110 may determine that the on-device ML model 400 is not confident enough in its processing of the input data, and therefore, the device 110 may request the system(s) 120 to complete processing with respect to the input data.

The ML model 500 may be a ML model included in the SLU component 255. As shown in FIG. 5, the ML model 500 of the system(s) 120 may include multiple processing nodes, such as nodes 510, 520, 530, 540, 545. Each of the processing nodes may include one or more processing blocks, such as, blocks 516, 522, 524, 526, 532, 534, 536, 542 and 546. The system(s) 120 may initiate processing at the ML model 500 based on where the device 110 left off. For example, the system(s) 120 may begin processing at the node 520 if the device 110 bridged processing at the node 402, where the node 520 in the ML model 500 may be the second node. Thus, the ML model 500 may not perform processing by the first node 510 that may be already performed by the first node 402 of the ML model 400. In this case, the system(s) 120 may continue processing at the ML model 500 via the nodes 520, 530, 540 and 545.

The node 545 may be the final processing node of the ML model 500, and may determine output data 550 representing a prediction of the ML model 500 on the system(s) 120 with respect to the input data. If the device 110 determines to bridge processing to the system(s) 120, then the output data 550 may be used as the prediction for the input data, and the output data 550 may be sent to downstream components (of the system 120) to perform further processing of the input data.

In some embodiments, the system ML model 500 may also include exit points (similar to the egress points of the ML model 400). At these exit points, the system(s) 120 may determine to cease processing or continue processing, based on the confidence level of the prediction generated by the corresponding node.

The feature data 509, 518, 528 and 538 may be the output of the last block in the corresponding node. In some embodiments, the feature data 509, 518, 528 and 538 may be embeddings determined based on processing by the corresponding node. In some embodiments, the feature data 509, 518, 528 and 538 may be token data determined based on processing by the corresponding node. In some embodiments, the device 110 may also send other data to the system(s) 120 along with the feature data 509, 518, 528 and 538. The other data may include, but is not limited to, context data corresponding to the input data, the input data, user profile data associated with the user that provided the input data, and other data. The context data may include device information (device type, device model, version number, device input/output capabilities) for the device 110 that received the input data, location information (user location, device 110 location), time information (when the input data was received), and other context information. The device 110 may encrypt the data sent to the system(s) 120, and the system(s) 120 may decrypt the received data prior to processing (such encryption and description may be performed using art-known/industry-known techniques). The device 110 may add noise to the data prior to sending the data to the system(s) 120, and the system(s) 120 may remove the noise or process the data with the noise. The added noise may be such that it may not impact the processing results.

In some embodiments, the ML model 400 may be included in the SLU component 355 and configured to process audio data 211 to determine NLU output data, and the ML model 500 may be included in the SLU component 255 and configured to process audio data 211 to determine NLU output data. In other embodiments, the ML model 400 may be included in the NLU component 360 and may be configured to process ASR output data to determine NLU output data, and the ML model 500 may be included in the NLU component 260 configured to process ASR output data to determine NLU output data. In yet other embodiments, the ML model 400 and the ML model 500 may be configured to process other types of data.

In some embodiments, the ML model 500 may be included in another device 110, and the ML model 400 may bridge processing to the ML model 500 on the device 110 (e.g., the device 110b). The device 110b may be associated with the device 110a (that includes the ML model 400) with respect to a user profile identifier—as in the device 110a and the device 110b may be associated with the same user 5. The device 110a and the device 110b may be associated with the same household (office, vehicle, hotel, building, etc.). The device 110b may have higher/better processing capabilities in terms of a processor and a memory included in the device 110b as compared to the processing capabilities of the device 110a.

Figure 6A:
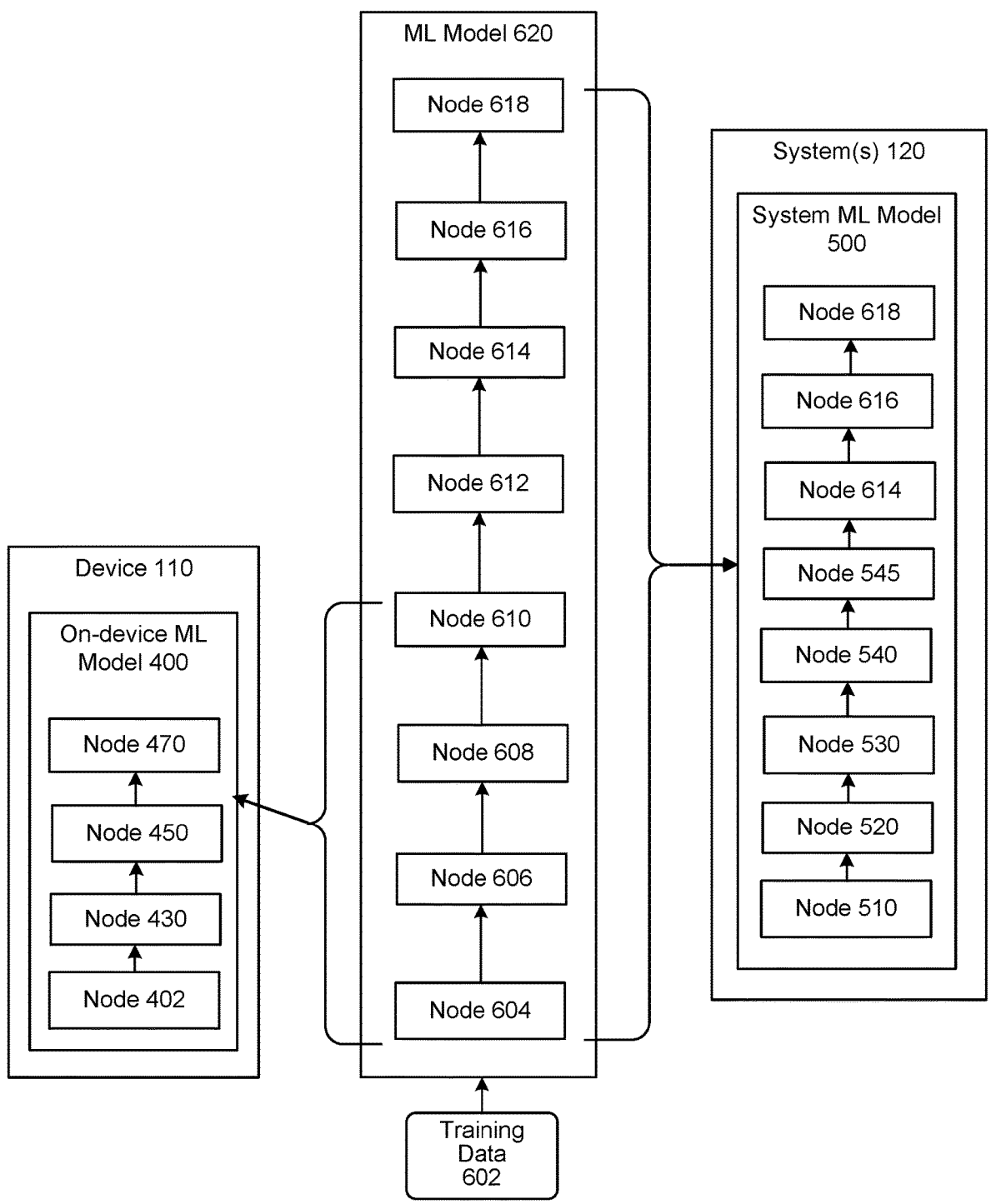
FIGS. 6A, 6B and 6C are conceptual diagrams illustrating how a machine learning model may be split, according to embodiments of the present disclosure.
Figure 6B:
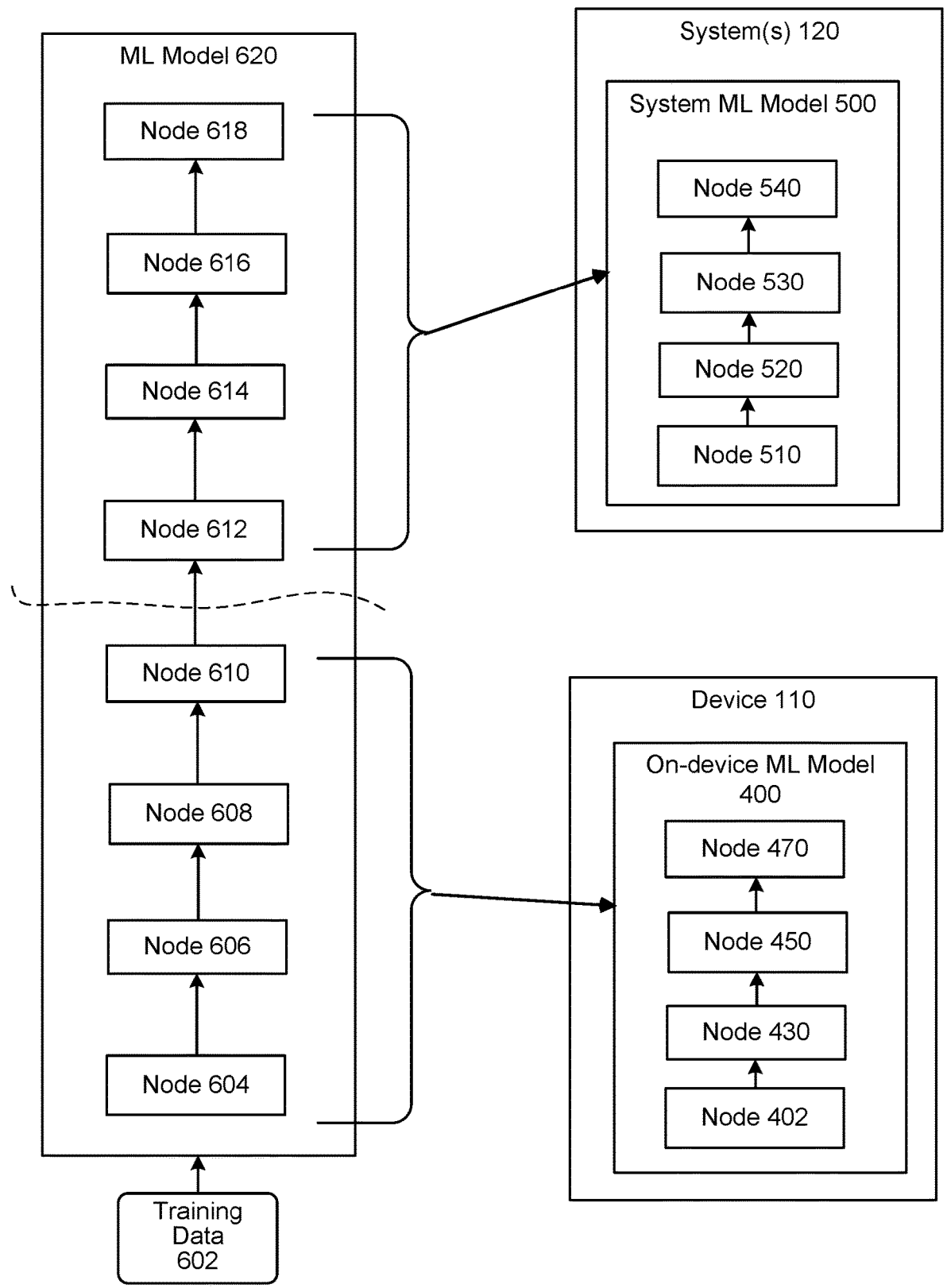
Figure 6C:
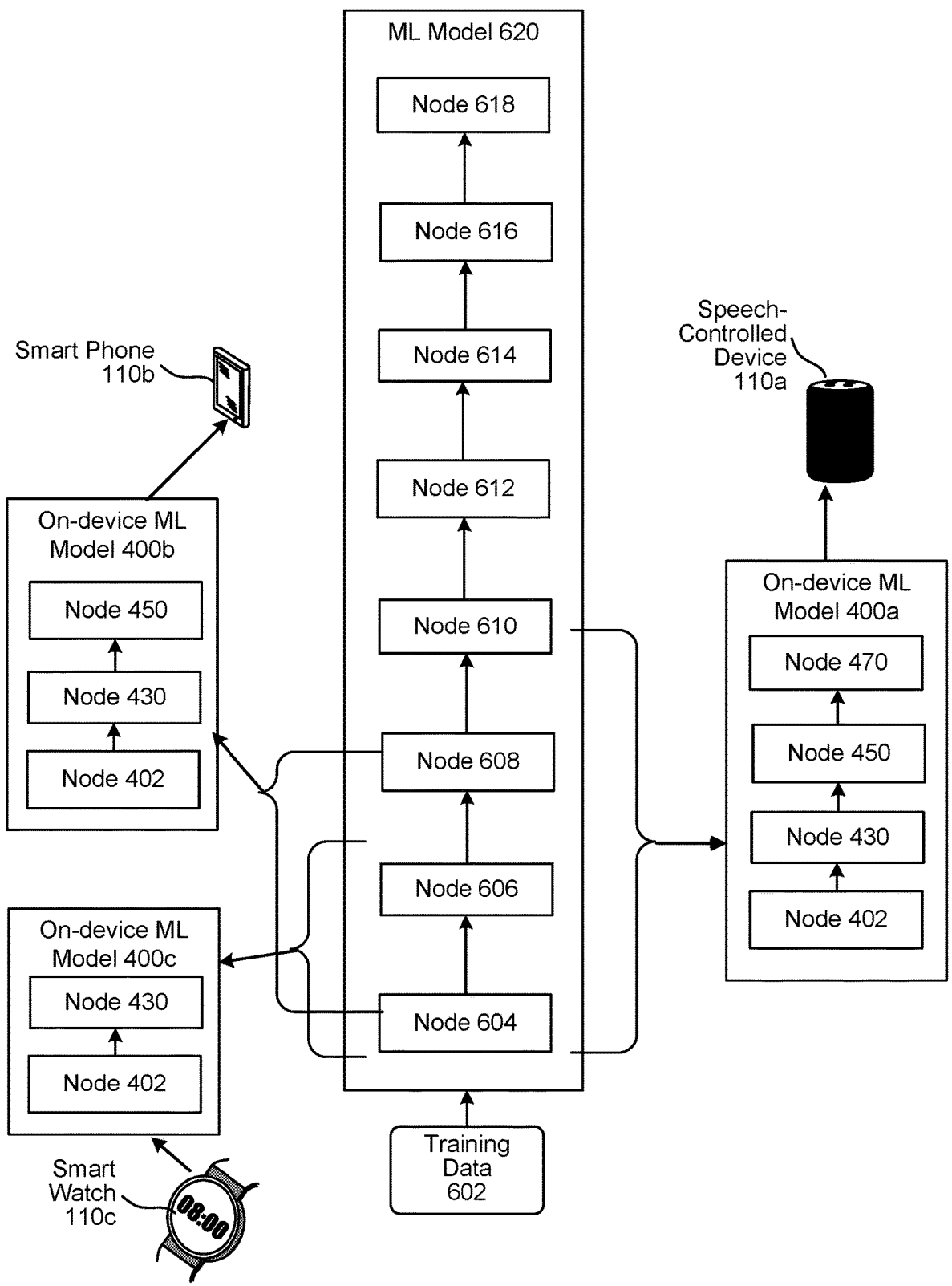

Given the size of some of the ML models, it may be difficult to compress an entire ML model to include in the device 110. Instead, splitting an ML model across environments may enable optimization of operations performed on the device 110. The modular structure of the ML models described herein may allow for the processing to be spilt across environments, as a subset of the processing nodes can reside on a user device and the remainder of the processing nodes (or the entire ML model) can reside on a system (e.g., a server, in the cloud, etc.) or on another device. FIGS. 6A, 6B and 6C are conceptual diagrams illustrating how a ML model 620 may be split, according to embodiments of the present disclosure. In some embodiments, a system(s) may train/configure the ML model 620 using training data 602. In the case that the ML model is to be used by the SLU components 255 and 355, the training data 602 may include annotated audio data. In the case that the ML model is to be used by the NLU components 260 and 360, the training data 602 may include annotated ASR output data. In the case that the ML model 620 is to be used for image processing, object recognition, and computer vision tasks, the training data 602 may include annotated image data and video data. In the case that the ML model 620 is to be used to detect sentiment from audio data, the training data 602 may include audio data labeled with a sentiment category. Using the training data 602, the system(s) may configure the ML model 620. In some embodiments, the ML model 620 may include multiple sequential processing nodes, such as, nodes 604, 606, 608, 610, 612, 614, 616 and 618.

As shown in FIG. 6A, in some embodiments, the ML model 620 may be spilt (divided) to generate the on-device ML model 400. In some embodiments, the on-device ML model 400 may include a set of processing nodes from the ML model 620 that correspond to the bottom processing nodes (sequentially first processing nodes) of the ML model 620. For example, the nodes 402, 430, 450 and 470 of the on-device ML model 400 may correspond respectively to the nodes 604, 606, 608 and 610 of the ML model 620. In this example embodiment, the ML model 500 of the system(s) 120 may include all of the processing nodes of ML model 620. In some embodiments, the system(s) 120 may use the training data 602 to configure the ML model 620, store the configured ML model 620 as the ML model 500, and then send data corresponding to the bottom set of the processing nodes of the ML model 620 to the device 110 to be stored as the ML model 400 at the device 110.

As shown in FIG. 6B, in some embodiments, the ML model 620 may be split (divided) to generate the on-device ML model 400 and the system ML model 500. In some embodiments, the on-device ML model 400 may include a set of the processing nodes from the ML model 620 that correspond to the bottom processing nodes (sequentially first processing nodes) of the ML model 620, while the system ML model 500 may include a set of the processing nodes from the ML model 620 that correspond to the top processing nodes (sequentially last processing nodes) of the ML model 620. For example, the nodes 402, 430, 450 and 470 of the on-device ML model 400 may correspond respectively to the nodes 604, 606, 608 and 610 of the ML model 620. The nodes 510, 520, 530 and 540 of the system ML model 500 may correspond respectively to the nodes 612, 614, 616 and 618 of the ML model 620.

Different devices 110 may include a different set or number of processing nodes from the ML model 620. Which nodes and the number of nodes included in the device 110 may be based on the processing capabilities (at least with respect to a processor and a memory) of the device 110. FIG. 6C shows how different devices 110 may include a different set of processing nodes. For example, as shown in FIG. 6C, the device 110a may include an on-device ML model 400a with four processing nodes corresponding to the bottom/first four processing nodes of the ML model 620, while the device 110b may include an on-device ML model 400b including three processing nodes corresponding to the bottom/first three processing nodes of the ML model 620, and the device 110c may include an on-device ML model 400c including two processing nodes corresponding to the bottom/first two processing nodes of the ML model 620. The system ML model 500 (not shown in FIG. 6C) may include all of the processing nodes of the ML model 620 (as shown in FIG. 6A). As described herein, the device 110, when bridging processing to the system(s) 120 or to another device 110, may send data representing a node where the on-device ML model 400 stopped processing, so that the system(s) 120 or the other device 110 may pick up processing at that point.

In splitting the ML model 620 and generating the on-device ML model 400, one or more final processing nodes may be added to the set of nodes for the on-device ML model 400, so that the on-device ML model 400 may be a fully functional ML model capable of outputting a prediction for input data. For example, a pooling layer or softmax layer may be added after the bottom set of nodes from the ML model 620.

In some embodiments, one or more compression techniques may be applied to the on-device ML model(s) 400 for storing at the device 110. These compression techniques may include reducing the total number of model parameters of the ML model(s) 400, thus reducing the amount of computations required to generate the prediction. The compression techniques may also include pruning the ML model 400 by removing one or more network connections with small contributions towards the prediction. The compression techniques may also include quantizing the processing nodes. In some embodiments, a neural architecture search model/algorithm may be used to automatically determine where, within the ML model 400, to insert branches and egress points, and which nodes/branches/egress points should be deployed to the device 110 based on the device's capabilities.

In some embodiments, the on-device ML model 400 and the system ML model 500 may be trained/configured separately, rather than split from a larger ML model. In some cases, the on-device ML model 400 may configured to perform a light (lite) version of processing as compared to the system ML model 500. In embodiments where the ML models are configured for SLU processing, the on-device ML model 400 may have reduced capabilities as compared to the system ML model 500, for example, the on-device ML model 400 may be able to process certain simple natural language inputs (e.g., "stop," "turn on the lights," "play music," etc.), while the system ML model 500 may be able to process the simple natural language inputs as well as complex natural language inputs (e.g., "find flights to Miami and book one that gets me there in time for my meeting"). A natural language input may be simple or complex based on the number of words in the input, the number of entities in the input, the number of verbs and/or nouns in the input, the number of requests in the input, the number of skills that may invoked to respond to the input, etc.

In some embodiments, the ML model 400 outputs within the same label space at each processing node 402, 430, 450 and 470. For example, each processing node, the ML model 400 is able to make a prediction from the same domain labels and intent labels.

In other embodiments, the ML model 400 outputs in different label spaces at different processing nodes 402, 430, 450 and 470. For example, at processing node 402, the ML model 400 may be able to make a prediction from a first subset of domains and intents, while at processing node 430 the ML model 400 may be able to make a prediction from a second subset of domains and intents, where the first subset may be different than the second subset or the first subset may be included in the second subset. For domains and intents that are not supported by the ML model 400, the device 110 may bridge processing to the system ML model 500.

In some embodiments, the device 110 may include a ML model, for example, a binary classifier, configured to determine whether the device 110 is able to generate a prediction for the input data (with a high confidence). In some embodiments, the device 110 may process the input data using the binary classifier, before sending the input data to the ML model 400 for processing. If the binary classifier determines that the ML model 400 will not be able to make a prediction with high confidence, then the device 110 may send the input data to the system(s) 120 for processing, and may not perform any processing of the input data at the device 110, and the system(s) 120 may start processing the input data at the first node 510 of the ML model 500. If the binary classifier determines that the ML model 400 will be able to make a prediction with high confidence, then the device 110 may send the input data to the ML model 400 for processing. In some embodiments, the decision blocks 422, 442, 460 and 474 may employ the binary classifier.

In some embodiments, where the ML models are configured for SLU processing, the binary classifier, may be configured using a training dataset that includes a first portion of data (of the same type as the input data) labeled as "simple" and a second portion of data labeled as "complex." If the input data corresponds to the "simple" category, then device 110 may process the input data, and if the input data corresponds to the "complex" category, then the device 110 may send the input data to the system(s) 120 for processing.

In some embodiments, the binary classifier may be configured using a training dataset that includes data (same type as the input data) labeled with a value/identifier indicating at which egress point the ML model 400 ceased processing for that data point. For example, the training dataset may include a first natural language input "stop" and the corresponding label may be "egress point 1" or "1" indicating that the ML model 400 exited processing at the first egress point (and used the prediction of the first node). In another example, the training dataset may include a second natural language input "turn off the lights in the bedroom" and the corresponding label may be "egress point 4" or "4" indicating that the ML model 400 exited processing at the fourth/ final egress point, indicating that all nodes of the ML model 400 had to be used to generate a prediction for this data point. In yet another example, the training dataset may include a third natural language input "play music" and the corresponding label may be "egress point 2" or "2" indicating that the ML model 400 exited processing at the second egress point (and used the prediction of the second node). Using the binary classifier, the device 110 may estimate which egress point the input data may have to be processed until. When that estimated egress point is reached, and other conditions exist (such as the data considered at the decision blocks 422, 442, 460 and 474), the device 110 may determine to cease processing or bridge processing, instead of continuing processing.

In some embodiments, the device 110 may process the input data using the entire ML model 400 (without checking the egress points), may send the processing results of the ML model 400 to the system(s) 120, and the system ML model 500 may complete processing of the input data based on the processing results of the ML model 400.

In some embodiments, the ML models 400 and 500 may be configured to perform SLU processing as described above. In other embodiments, the ML models 400 and 500 may be configured to process image data and video data for various tasks, such as, object recognition, facial recognition, gesture recognition, text recognition, computer vision tasks, etc. In yet other embodiments, the ML models 400 and 500 may be configured to process other types of data (e.g., motion sensor data, text data, non-speech audio data, etc.) to perform other tasks, such as, predictive analysis, classification analysis, user activity detection, etc.

FIG. 7 is a signal flow diagram illustrating how input data may be processed by the device 110 and the system(s) 120. The device 110 may receive (702) input data, for example audio data 211 or text data 213, and the device 110 may process (704) the input data using an on-device ML model(s). At decision block 706, the device 110 may determine to cease processing or bridge processing with respect to the input data being processed by the on-device ML model(s). In this example case, the device 110 may bridge (707) processing to the system(s) 120. The device 110, in this case, may send (708) feature data to the system(s) 120, where the feature data is determined by or generated by the on-device ML model(s) when processing the input data. The device 110 may also send (710) a model stopping point to the system(s) 120, where the model stopping point may represent the point (a processing node and/or a processing block) within the on-device ML model(s) up to which the on-device ML model(s) completed processing with respect to the input data.

The system(s) 120 may process (712) the feature data using a system ML model(s) based on the model stopping point. The system(s) 120 may pick up processing where the on-device ML model(s) left off with respect to the input data. As such, the system(s) 120 may use the feature data, provided by the device 110, to initialize a processing node of the system ML model(s). The system(s) 120 may determine which processing node to initialize based on the model stopping point.

The system(s) 120 may process the input data, as described in relation to FIG. 2, and may select (714) a skill to respond to the input data. The system(s) 120 may send (716) data corresponding to the input data to a skill system(s) 225/skill component(s) 290/390 associated with the selected skill. The skill system 225 may send (718) output data to the device 110, where the output data is responsive to the input data received at step 702. Alternatively, the skill system 225 may send the output data to the system(s) 120, which sends the output data to the device 110.

In this manner, an on-device ML model(s) may process input data, but may not complete the processing of the input data or may not be confident in its processing of the input data, and may send data to the system(s) 120 to enable the system(s) 120 to complete processing with respect to the input data.

FIG. 8 is a signal flow diagram illustrating how input data may be processed by the device 110. The device 110 may receive (802) input data, for example, audio data 211 or text data 213, and the device 110 may process (804) the input data using an on-device ML model(s). At decision block 806, the device 110 may determine to cease processing or bridge processing with respect to the input data being processed by the on-device ML model(s). In this example case, the device 110 may cease (808) processing at the on-device ML model(s). Using the output of the on-device ML model(s), the device 110 may perform further processing as described in relation to FIG. 3. The device 110 may select (810) a skill to respond to the input data. The system(s) 120 may send (812) data corresponding to the input data to a skill system(s) 225/skill component(s) 290/390 associated with the selected skill. The skill system 225 may send (814) output data to the device 110, where the output data is responsive to the input data received at step 802. In this manner, the device 110 may complete processing with respect to the input data at the device 110, without requesting the system(s) 120 to perform some processing.

Figure 9:
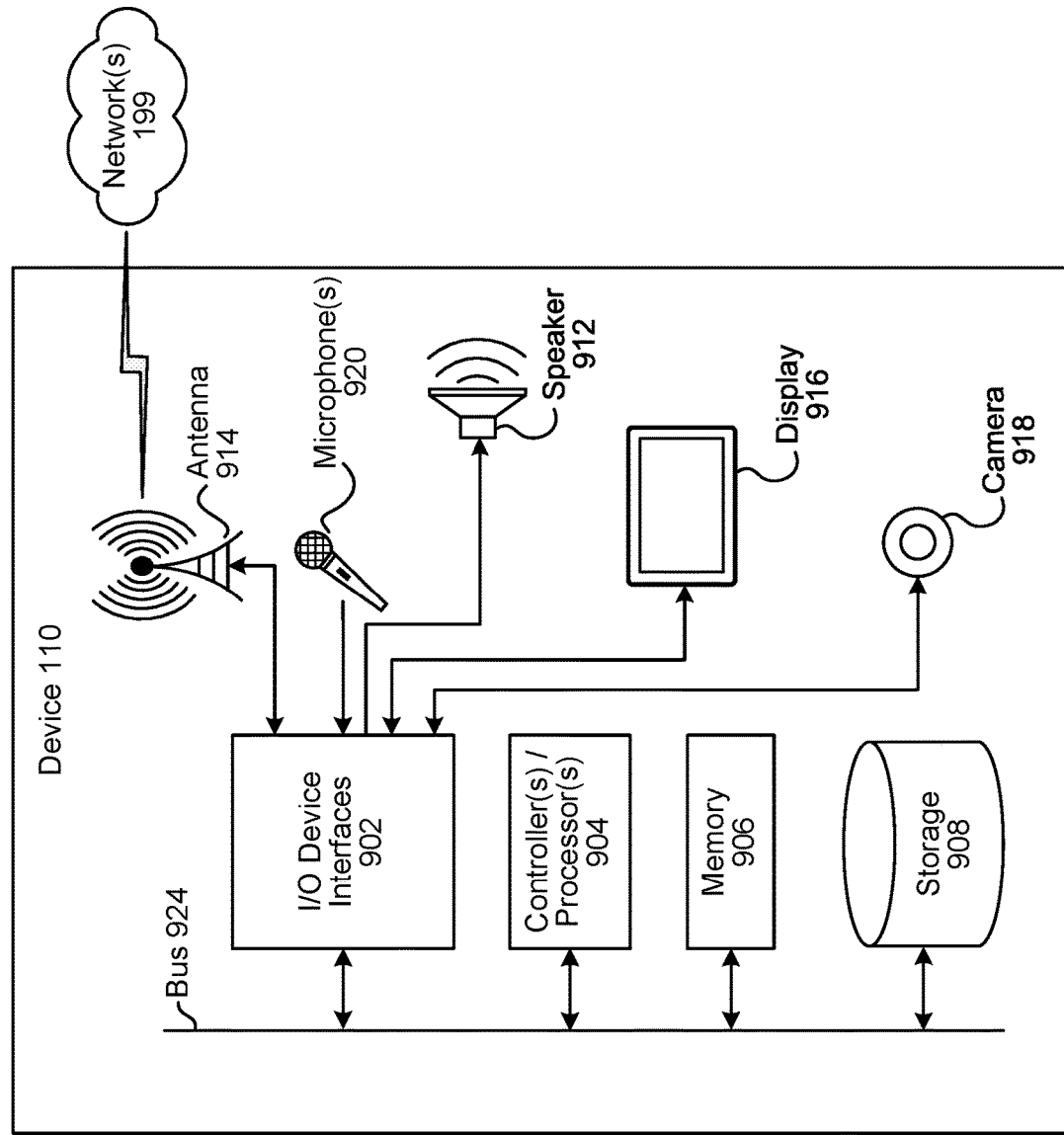
FIG. 9 is a block diagram conceptually illustrating example components of a device, according to embodiments of the present disclosure.
Figure 10:
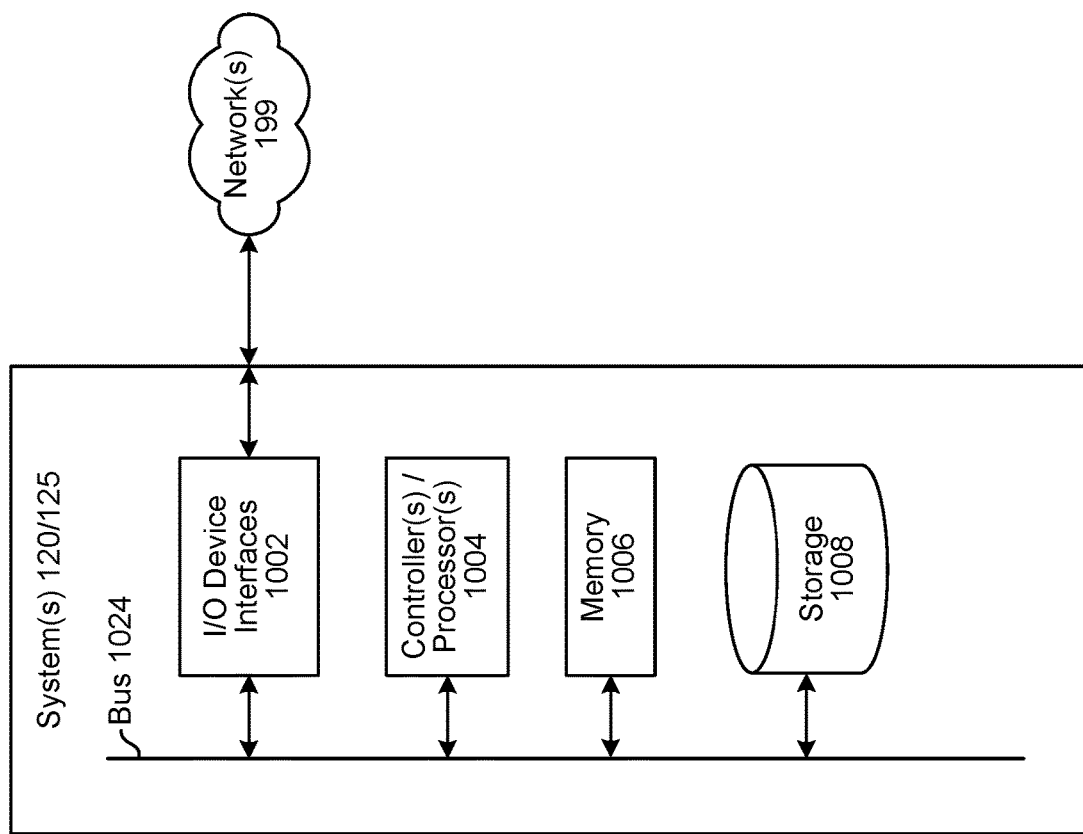
FIG. 10 is a block diagram conceptually illustrating example components of a system, according to embodiments of the present disclosure.

FIG. 9 is a block diagram conceptually illustrating example components of a device 110 according to the present disclosure. FIG. 10 is a block diagram conceptually illustrating example components of a system, such as the system 120 or a skill system 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the system 100 of the present disclosure, such as one or more systems 120 for performing ASR processing, one or more systems 120 for performing NLU processing, and one or more skill systems 225, etc. In operation, each of these systems may include computer-readable and computer-executable instructions that reside on the respective device (120/225), as will be discussed further below.

Each of these devices (110/120/225) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (902/1002).

Computer instructions for operating each device (110/120/225) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/225) includes input/output device interfaces (902/1002). A variety of components may be connected through the input/output device interfaces (902/1002), as will be discussed further below. Additionally, each device (110/120/225) may include an address/data bus (924/1024) for conveying data among components of the respective device. Each component within a device (110/120/225) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to a network(s) 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system 120, and/or a skill system 225 may include their own dedicated processors, memory, and/or storage. Alternatively, one or more of the components of the device 110, the system 120, and/or a skill system 225 may utilize the I/O interfaces (902/1002), processor(s) (904/1004), memory (906/1006), and/or storage (908/1008) of the device(s) 110, system 120, or the skill system 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 225, as described herein, are illustrative, and may be located as a stand-alone device or may be included, in whole or in part, as a component of a larger device or system.

Figure 11:
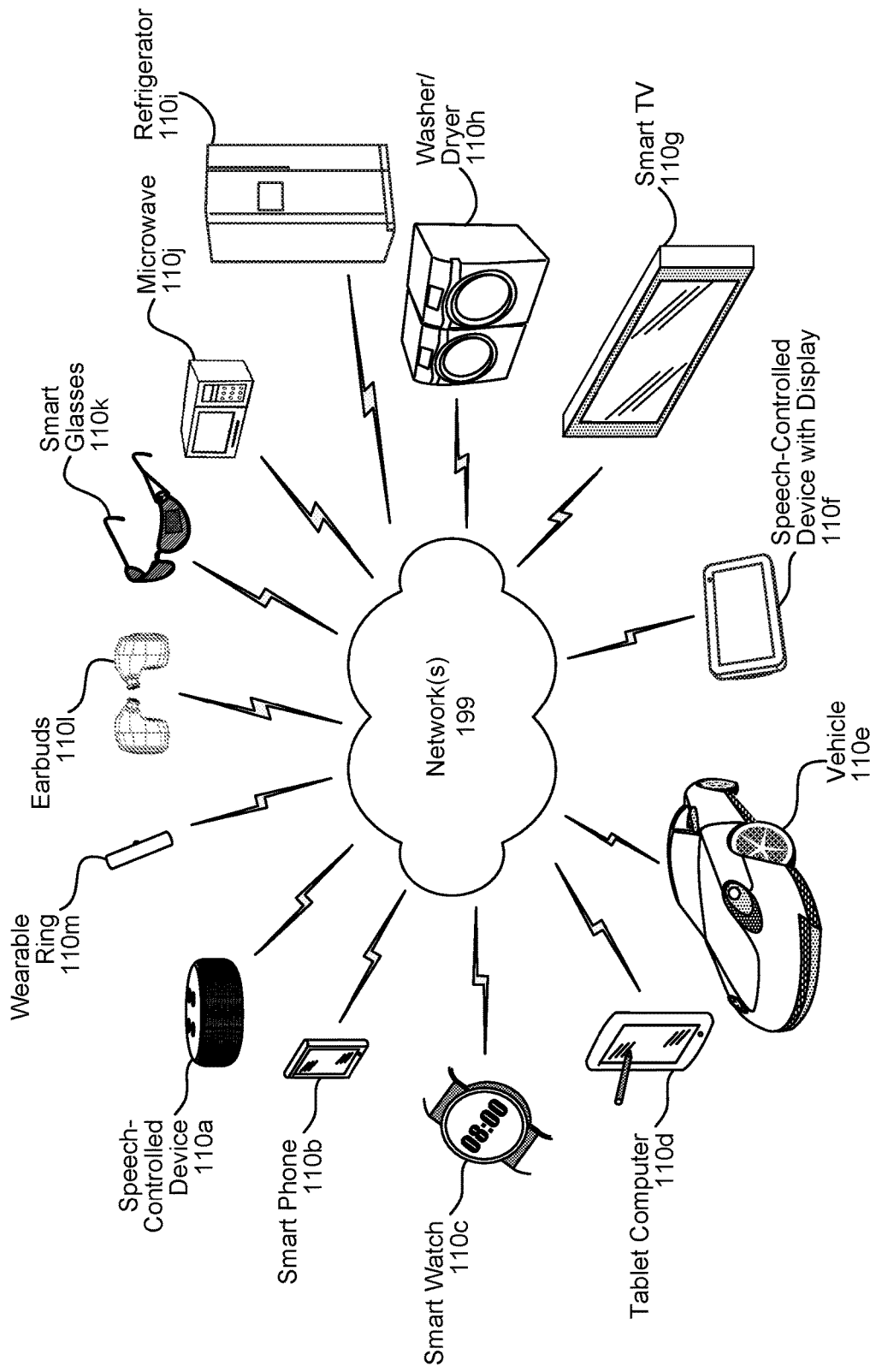
FIG. 11 illustrates an example of a computer network for use with the overall system, according to embodiments of the present disclosure.

As illustrated in FIG. 11, multiple devices (110a-110l) may process as part of the system 100. The network(s) 199 may include a local or private network or may include a wide network such as the Internet. Devices may be connected to the network(s) 199 through either wired or wireless connections. For example, the system 100 may include a speech-controlled device(s) 110a, a smart phone(s) 110b, a smart watch(s) 110c, a tablet computer(s) 110d, a vehicle(s) 110e, a speech-controlled display device(s) with a display 110f, a smart television(s) 110g, a washer(s)/dryer(s) 110h, a refrigerator(s) 110i, a microwave(s) 110j, smart glasses 110k, earbuds 110l, and/or a wearable ring(s) 110m.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A system comprising:
   a first component including at least a first processor and at least a first memory, wherein the first component is a user device; and
   a second component including at least a second processor and at least a second memory, wherein the second component is a second device that uses a network connection to communicate with the first component,
   the at least first memory including first instructions that, when executed by the at least first processor, cause the first component to:
   receive first audio data representing a first spoken user input;
   using a first node of a first machine learning (ML) model, the first ML model configured to perform spoken language understanding (SLU) processing, process a first portion of the first audio data to determine embedding data representing a partial speech recognition output of the first node;
   determine, based on the embedding data, the second component is to process to generate a SLU output; and
   in response to determining the second component is to process to generate the SLU output, and prior to processing the embedding data using a second node of the first ML model, send the embedding data to the second component,
   the at least second memory including second instructions that, when executed by the at least second processor, cause the second component to:
   process the embedding data using a second ML model to complete the SLU processing of the first audio data;
   determine, using the second ML model, a first SLU output;
   determine, using the first SLU output, a first output responsive to the first spoken user input; and
   send the first output to the first component.

2. The system of claim 1, wherein the first instructions, when executed by the at least first processor, further cause the first component to:
- Send, to the second component, a node identifier corresponding to the first node of the first ML model;
- send, to the second component, a device identifier corresponding to the user device;
- process the first audio data to perform user recognition and determine a profile identifier corresponding to the first audio data; and
- send, to the second component, the profile identifier.

3. The system of claim 1, wherein the first instructions, when executed by the at least first processor, further cause the first component to:
- receive second audio data representing a second spoken user input;
- using a classifier, process the second audio data to determine a confidence value representing a likelihood of the first ML model being able to process the second audio data;
- based on the confidence value failing to meet a threshold, determine that the second audio data is to be sent to the second component to generate a second SLU output; and
- send the second audio data to the second component to perform SLU processing.

4. A computer-implemented method comprising:
- receiving, at a first device, first input data corresponding to a first input;
- processing, at the first device, a first portion of the first input data using a second portion of a first machine learning (ML) model, wherein the second portion of the first ML model comprises a first node of the first ML model;
- determining, at the first device and based at least in part on processing the first portion of the first input data using the second portion of the first ML model, first embedding data representing a partial speech recognition output of the second portion of the first ML model;
- determining, based on the first embedding data, a second device is to complete the processing of the first input data; and
- in response to determining the second device is to complete the processing of the first input data, and prior to processing the first embedding data using a third portion of the first ML model, sending the first embedding data to the second device to complete the processing of the first input data using a second ML model, wherein:
  - the third portion of the first ML model comprises a second node of the first ML model,
  - the first ML model and the second ML model are configured to perform a first type of processing, and
  - sending the first embedding data to the second device causes the second device to complete the first type of processing of the first input data using the second ML model to determine a response to the first input.

5. The computer-implemented method of claim 4, wherein the first embedding data is determined by the first node of the second portion of the first ML model, and the method further comprises:
- processing, at the first device, the first embedding data using the second node of the third portion of the first ML model;
- determining, at the first device, second embedding data output by the second node;
- processing the first embedding data with respect to the second embedding data; and
- sending the second embedding data to the second device based at least in part on the processing of the first embedding data with respect to the second embedding data.

6. The computer-implemented method of claim 4, wherein:
- receiving the first input data comprises receiving audio data representing a spoken input, and
- processing the first portion of the first input data using the second portion of the first ML model comprises processing a fourth portion of the audio data using the second portion of the first ML model, wherein the first ML model is configured for spoken language understanding (SLU) processing, and wherein the second ML model is configured for SLU processing.

7. The computer-implemented method of claim 4 wherein:
- receiving the first input data comprises receiving image data representing an object, and
- processing the first portion of the first input data using the second portion of the first ML model comprises processing a fourth portion of the image data using the second portion of the first ML model, wherein the first ML model is configured for object recognition, and wherein the second ML model is configured for object recognition.

8. The computer-implemented method of claim 4, further comprising:
- receiving second input data corresponding to a second input;
- processing a fourth portion of the second input data using the first node of the second portion of the first ML model;
- determining second embedding data output by the first node;
- processing the second embedding data to determine an entropy value corresponding to the second embedding data;
- determining the entropy value satisfies a threshold value; and
- based on the entropy value satisfying the threshold value, determining, using the second embedding data, first output data responsive to the second input.

9. The computer-implemented method of claim 4, further comprising:
- receiving second input data corresponding to a second input;
- using a classifier, processing the second input data to determine a likelihood that the first ML model is able to process the second input data to generate a first output;
- based on the likelihood failing to meet a threshold, determining to send the second input data to the second device for processing; and
- sending the second input data to the second device to generate the first output responsive to the second input.

10. The computer-implemented method of claim 4, further comprising:
- receiving second input data corresponding to a second input;
- using the first node of the second portion of the first ML model, processing a fourth portion of the second input data to determine second embedding data;
- determining the second embedding data satisfies a first threshold condition;

using the second node of the third portion of the first ML model, processing the second embedding data to determine third embedding data;

determining the third embedding data satisfies a second threshold condition; and sending the third embedding data to the second device to perform processing using the second ML model.

11. The computer-implemented method of claim 10, further comprising:

processing, at the second device using the second ML model, the second embedding data to determine fourth embedding data;

determining, at the second device and using the fourth embedding data, a first output responsive to the second input; and sending, from the second device to the first device, the first output.

12. The computer-implemented method of claim 4, wherein:

the first ML model includes a first plurality of nodes, the second ML model includes a second plurality of nodes, the first embedding data is determined based on processing the first portion of the first input data using the first node of the second portion of the first ML model, and the method further comprises:

receiving, at the second device from the first device, an indication representing the first node of the first ML model, wherein the processing of the first embedding data at the second device is performed by a third node of the second ML model instead of a fourth node of the second ML model based on the indication.

13. The computer-implemented method of claim 4, further comprising:

configuring, using training data, the second ML model to perform the first type of processing, the second ML model comprising a plurality of nodes;

storing, at the first device, a first set of nodes, from the plurality of nodes, as the first ML model, wherein the first set is based on a processing capacity of the first device;

storing, at a third device, a second set of nodes, from the plurality of nodes, as a third ML model, wherein the second set is based on a processing capacity of the third device; and storing, at the second device, the second ML model.

14. A system comprising:

a first device including at least one processor, and at least one memory including instructions that, when executed by the at least one processor, cause the first device to:

receive first input data corresponding to a first input;

process a first portion of the first input data using a second portion of a first machine learning (ML) model, wherein the second portion of the first ML model comprises a first node of the first ML model;

determine, based at least in part on processing the first portion of the first input data using the second portion of the first ML model, first embedding data representing a partial speech recognition output of the second portion of the first ML model;

determine, based at least in part on the first embedding data, a second device is to complete the processing of the first input data; and in response to determining the second device is to complete the processing of the first input data, and prior to processing the first embedding data using a third portion of the first ML model, send the first embedding data to the second device to complete the processing of the first input data using a second ML model, wherein:

the third portion of the first ML model comprises a second node of the first ML model, the first ML model and the second ML model are configured to perform a first type of processing, and sending the first embedding data to the second device causes the second device to complete the first type of processing of the first input data using the second ML model to determine a response to the first input.

15. The system of claim 14, wherein the first embedding data is determined by the first node of the second portion of the first ML model, and the instructions that, when executed by the at least one processor, further cause the first device to:

process the first embedding data using the second node of the third portion of the first ML model;

determine second embedding data output by the second node;

process the first embedding data with respect to the second embedding data; and send the second embedding data to the second device based at least in part on processing the first embedding data with respect to the second embedding data.

16. The system of claim 14, wherein:

the first input data comprises audio data representing a spoken input, and the first ML model and the second ML model are configured for SLU processing.

17. The system of claim 14, wherein:

the first input data comprises image data representing an object, and the first ML model and the second ML model are configured for object recognition.

18. The system of claim 14, wherein the instructions that, when executed by the at least one processor, further cause the first device to:

receive second input data corresponding to a second input;

process a fourth portion of the second input data using the first node of the second portion of the first ML model;

determine second embedding data output by the first node;

processing the second embedding data to determine an entropy value corresponding to the second embedding data;

determine the entropy value satisfies a threshold value; and based on the entropy value satisfying the threshold value, determine, using the second embedding data, first output data responsive to the second input.

19. The system of claim 14, wherein the instructions that, when executed by the at least one processor, further cause the first device to:

receive second input data corresponding to a second input;

using a classifier, process the second input data to determine a likelihood that the first ML model is able to process the second input data to generate a first output;

based on the likelihood failing to meet a threshold, determine to send the second input data to the second device for processing; and send the second input data to the second device to generate the first output responsive to the second input.

20. The system of claim 14, wherein the instructions that, when executed by the at least one processor, further cause the first device to:
- receive second input data;
- using the first node of the second portion of the first ML model, process a fourth portion of the second input data to determine second embedding data;
- determine the second embedding data satisfies a first threshold condition;
- using the second node of the second portion of the first ML model, process the second embedding data to determine third embedding data;
- determine the third embedding data satisfies a second threshold condition; and
- send the third embedding data to the second device to perform processing using the second ML model.

\* \* \* \* \*